US012759155B2

(12) United States Patent
Zielinski et al.

(10) Patent No.: US 12,759,155 B2
(45) Date of Patent: Oct. 13, 2026

(54) AUGMENTED REALITY SUPPORTED SAFETY PLANE ADJUSTMENT

(71) Applicant: Universal Robots A/S, Odense (DK)

(72) Inventors: Krzysztof Zielinski, Odense (DK); Jakob Schultz Ormhøj, Odense (DK)

(73) Assignee: Universal Robots A/S, Odense S (DK)

( * ) Notice: Subject to any disclaimer, the term of this patent is extended or adjusted under 35 U.S.C. 154(b) by 15 days.

(21) Appl. No.: 18/726,577

(22) PCT Filed: Jan. 9, 2023

(86) PCT No.: PCT/DK2023/050005
§ 371 (c)(1),
(2) Date: Jul. 3, 2024

(87) PCT Pub. No.: WO2023/131385
PCT Pub. Date: Jul. 13, 2023

(65) Prior Publication Data

US 2025/0073908 A1 Mar. 6, 2025

(30) Foreign Application Priority Data

Jan. 10, 2022 (DK) ............................. PA202270005

(51) Int. Cl.
*B25J 9/16* (2006.01)
*G06T 11/00* (2026.01)

(52) U.S. Cl.
CPC ............. *B25J 9/1676* (2013.01); *G06T 11/00* (2013.01)

(58) Field of Classification Search
CPC ...... B25J 9/1676; B25J 9/1674; B25J 9/1697; G06T 11/00; G05B 2219/39451; G05B 2219/40611
See application file for complete search history.

(56) References Cited

U.S. PATENT DOCUMENTS 4,763,531 A 8/1988 Dietrich et al.
10,399,232 B2 9/2019 Oestergaard et al.
(Continued)

FOREIGN PATENT DOCUMENTS

CN 108213988 A 6/2018
CN 109922949 A 6/2019
(Continued)

OTHER PUBLICATIONS

International Search Report and Written Opinion for related Application No. PCT/DK2023/050005 dated Apr. 11, 2023 (17 pgs.).
(Continued)

*Primary Examiner* — Dylan M Katz
(74) *Attorney, Agent, or Firm* — ARENTFOX SCHIFF LLP

(57) ABSTRACT

The invention relates to a method for AR assisted adjustment of a safety plane for a robot via a portable AR device comprising a physical display and a camera. The method comprises the steps of establishing a spatial reference system defined with reference to said robot. Connecting said portable AR device to a robot controller. Recording the surroundings of said portable AR device including said robot. Displaying said recording of said surroundings on said physical display. Establishing a virtual environment according to said spatial reference system overlaying said recorded surroundings, wherein said virtual environment comprises at least on safety plane. Manually perform, via said physical display, a safety plane displacement of said safety plane in said spatial reference system in said virtual environment, and transfer said displaced location of said safety plane to said robot controller.

27 Claims, 9 Drawing Sheets

(56) References Cited

U.S. PATENT DOCUMENTS

Figure 1:
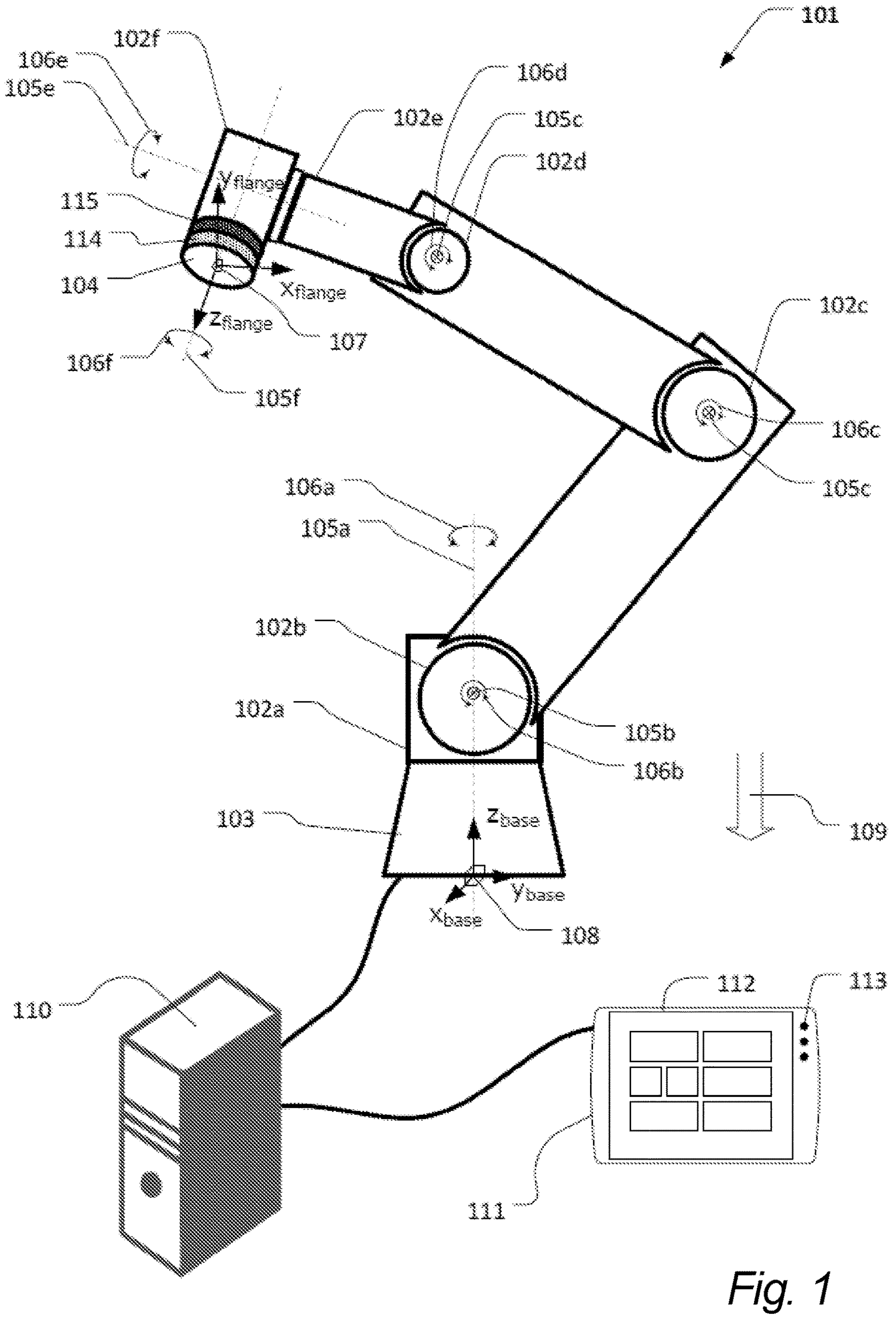

| | | | |
|---|---|---|---|
| D895,704 | S | 9/2020 | Johansen |
| D895,705 | S | 9/2020 | Johansen |
| D895,706 | S | 9/2020 | Johansen |
| D898,090 | S | 10/2020 | Johansen |
| 10,850,393 | B2 | 12/2020 | Oestergaard et al. |
| D915,487 | S | 4/2021 | Sell |
| D924,228 | S | 7/2021 | Mirth |
| D932,485 | S | 10/2021 | Mirth |
| D932,486 | S | 10/2021 | Mirth |
| D932,487 | S | 10/2021 | Mirth |
| 11,260,543 | B2 | 3/2022 | Johansen |
| 11,474,510 | B2 | 10/2022 | Oestergaard et al. |
| 11,796,045 | B2 | 10/2023 | Johansen |
| 11,839,979 | B2 | 12/2023 | Rosenlund et al. |
| 11,964,389 | B2 | 4/2024 | Johansen |
| 12,011,824 | B2 | 6/2024 | Vraa et al. |
| 2010/0211220 | A1 | 8/2010 | Nishi et al. |
| 2013/0079928 | A1 | 3/2013 | Soee-Knudsen et al. |
| 2013/0231778 | A1 | 9/2013 | Oestergaard |
| 2013/0255426 | A1 | 10/2013 | Kassow et al. |
| 2015/0204742 | A1 | 7/2015 | Draisey |
| 2016/0016315 | A1* | 1/2016 | Kuffner, Jr. .............. B25J 19/06 901/49 |
| 2016/0207198 | A1 | 7/2016 | Willfor et al. |
| 2018/0144459 | A1 | 5/2018 | Hamadou et al. |
| 2019/0389066 | A1* | 12/2019 | Jung ...................... B25J 9/1661 |
| 2020/0030979 | A1 | 1/2020 | Bank et al. |
| 2020/0171658 | A1 | 6/2020 | Kielsholm Thomsen |
| 2021/0086374 | A1 | 3/2021 | Brandt et al. |
| 2021/0174597 | A1 | 6/2021 | Parfenov et al. |
| 2021/0237278 | A1 | 8/2021 | Huber et al. |
| 2021/0260757 | A1 | 8/2021 | Nielsen et al. |
| 2021/0260759 | A1 | 8/2021 | Knudsen et al. |
| 2022/0063090 | A1 | 3/2022 | Seki |
| 2022/0161433 | A1 | 5/2022 | Beck et al. |
| 2022/0184810 | A1 | 6/2022 | Beck et al. |
| 2022/0226993 | A1 | 7/2022 | Madsen |
| 2022/0379463 | A1 | 12/2022 | Hansen |
| 2022/0379468 | A1 | 12/2022 | Hansen |
| 2022/0388156 | A1 | 12/2022 | Hansen |
| 2023/0035296 | A1 | 2/2023 | Søe-Knudsen et al. |
| 2023/0052996 | A1 | 2/2023 | Thomsen |
| 2023/0191603 | A1 | 6/2023 | Thomsen et al. |
| 2023/0405819 | A1 | 12/2023 | Kravchenko et al. |
| 2023/0405822 | A1 | 12/2023 | Kravchenko et al. |
| 2023/0418258 | A1 | 12/2023 | Mirth |
| 2024/0351209 | A1 | 10/2024 | Graabaek et al. |

FOREIGN PATENT DOCUMENTS

| | | | |
|---|---|---|---|
| DK | 202270090 | A1 | 1/2024 |
| EP | 1435550 | A1 | 7/2004 |
| EP | 2783812 | A3 | 4/2015 |
| EP | 3831553 | A1 | 6/2021 |
| JP | 2001-060108 | A | 3/2001 |
| JP | 2021-008033 | A | 1/2021 |
| WO | 2014/110682 | A1 | 7/2014 |
| WO | 2020/006144 | A1 | 1/2020 |

OTHER PUBLICATIONS

Jiang et al., "Inferring and monitoring invariants in robotic systems," Autonomous Robots, Kluwer Academic Publishers, Dordrecht, NL, vol. 41, No. 4, 2016, pp. 1027-1046.

Anandan Tanya M., "Control Engineering Plug-and-play robot ecosystems on the rise", Control Engineering, XP93050003, Dec. 27, 2021, pp. 1-18.

File History received for EP Application No. 23702746.1, downloaded on dated Dec. 20, 2024, 223 pages.

International Search Report and Written Opinion received for PCT Patent Application No. PCT/DK2023/050036, mailed on Jun. 12, 2023, 11 pages.

Search Report and Opinion received for DK Patent Application No. PA202270005, mailed on Jul. 22, 2022, 9 pages.

Search Report and Search Opinion received for Danish Application No. PA 2022 70090, mailed on Mar. 20, 2023, 3 pages.

Search Report and Search Opinion received for Danish Application No. PA 2022 70090, mailed on Sep. 20, 2022, 8 pages.

Universal Robots., "User Manual UR3/CB3", Version 3.1, Jan. 1, 2009, 181 pages.

* cited by examiner

AUGMENTED REALITY SUPPORTED SAFETY PLANE ADJUSTMENT

CROSS-REFERENCE TO RELATED APPLICATIONS

This application is a U.S. national stage entry of PCT application no. PCT/DK2023/050005 which was filed on Jan. 9, 2023. PCT application no. PCT/DK2023/050005 claims priority to Denmark application no. PA202270005 which was filed on Jan. 10, 2022. This application claims priority to both PCT application no. PCT/DK2023/050005 and to Denmark application no. PA202270005. Both PCT application no. PCT/DK2023/050005 and Denmark application no. PA202270005 are incorporated into this this application by reference.

FIELD OF THE INVENTION

The invention relates to a robot system comprising a robot controlled by a robot controller and a portable AR (AR; Augmented Reality) device and a method of adjusting a safety plane associated with said robot via a physical display of said portable AR device.

BACKGROUND OF THE INVENTION

AR has been widely known for several years as tool to assist a user in installation or production processes, guide tourists through cities, etc. Also in robotics, AR is known as a tool helping the user of the robot e.g. in setting up work spaces for the robot. As an example, could be mentioned US2019389066 which disclose an AR system for visualizing and modifying robot operational zones. The system disclosed in US2019389066 includes an AR device such as a headset in communication with a robot controller. The AR device displays to the user operational zones overlaid on real world images of the robot and existing fixtures, where the display is updated as the user moves around the robot work cell. Control points on the virtual operational zones are displayed and allow the user to reshape the operational zones.

The AR system disclosed in US2019389066 allow the user to shape operational zones of by virtually moving the corners of an operation zone, however many user find this method difficult and cumbersome to define the operation zones. A problem with prior art disclosed in US2019389066 is that with the high degree of flexibility in shaping operation zones by virtually moving corners of an operation zone follows a heavy processing of input.

Prior art document US2021237278 disclose to use AR to visualize a "safety cell" around a robot after an alignment between a virtual model of the robot is made with the real-world robot. A second safety cell can be defined a distance from a first safety cell and the distance therebetween is freely configurable by a user.

Prior art document EP2783812 disclose a robot that is controlled by a data processor. The data processor includes: a virtual-space-data holder configured to hold virtual space data including information on a virtual object in a virtual space, the virtual space simulating a real working space of the robot, the virtual object simulating an object present in the real working space; and an augmented-reality-space-data generator configured to generate augmented-reality-space data by use of the image data and the virtual space data.

Accordingly, the prior art discloses how to visualize safety cells in an AR environment, but it does not concern how to use an AR device to adjust individual walls of such safety cell.

SUMMARY OF THE INVENTION

The object of the present invention is to address the above-described problem with the prior art or other problems of the prior art. This is achieved by the method, and robot system according to the independent claims where the dependent claims describe possible embodiments of the robot and the method according to the present invention. (¶AA)

An aspect of the invention relates to a method for AR (AR; Augmented Reality) assisted adjustment of a safety plane for a robot via a portable AR device comprising a physical display and a camera, where said robot is controlled by a robot controller, the method comprises the steps of by said robot controller establishing a spatial reference system defined with reference to said robot. Communicatively connecting said portable AR device to said robot controller. Via said camera, recording the surroundings of said portable AR device including said robot. Displaying said recording of said surroundings on said physical display. Establishing a virtual environment according to said spatial reference system overlaying said recorded surroundings. Manually perform, via said physical display, a displacement of said safety plane in said spatial reference system in said virtual environment, and transfer said displaced location of said safety plane to said robot controller.

This is advantageous and has the surprising effect, that the complete safety plane can be displaced manually by one movement of a finger of the user via the physical display. Manually performing displacement of a safety plane virtually illustrated in a virtual environment on a physical display of an AR device is advantageous in that it has the effect, that it is possible for the user to position the safety plane based on views of the robot arm from different angles. Using a physical display for displacement of a safety plane has the effect of being intuitive and at the same time it is easy to monitor the displacement process i.e. the steps with which the safety plane is moved.

Displacement may be interpreted as moving an entire safety plane along one axis of a spatial reference system, translate one position in the spatial reference system to another position in the spatial reference system, rotate the safety plane around a point or axis, etc.

AR assisted should in this document include visualization of robot control software elements overlaid recording of real-world items making it possible to see virtually, element of the robot control software which was otherwise not visible. More specifically the visualized virtual robot control software elements are safety planes the position of which, manually via the physical display of an AR device, is possible to move, by a user e.g. via touching the display, and subsequently upload the new position coordinates to the robot control software.

Safety plane should in this document include a set of coordinates that defines a plane in the special reference system that triggers a reaction in the robot control software such as changing status of an output, reduce an operation parameter/threshold e.g. related to speed, torque, etc., change mode of operation e.g. to safe or stop mode, etc.

Spatial reference system should in this document include a cartesian coordinate system with a three axes coordinate system via which the different parts of the robot can be positioned in space, a polar coordinate system, a cylindrical coordinate system, a spherical coordinate system or in joint space where coordinates are defined in terms of the joint angles of a robot arm.

Virtual environment should in this document include one or more non-physical items that is displayed superimposed real-world items. The real-world items are recorded by a camera of physical AR device and on the display of the AR device the virtual environment is superimposed the recorded items of the real world. Non-physical items include but are not limited to robot control software elements such as safety plane and limits for freedom of joints, tools, etc. and virtual obstacles, payload, etc.

Communicatively connected should in this document include a bidirectional data connection where data is able to flow via the connection from one device to the other. Communication is possible at when connected, which e.g. can be done by scanning a QR tag associated with the robot. It should be mentioned, that during creation or displacement of a safety plane, communication between AR device and robot controller may not happen, however before and after creation or displacement communication may happen.

Recorded surroundings should in this document include live view of what the camera of the AR device is pointing towards, live view does not necessarily mean store the recordings.

According to an embodiment, said displacement of said safety plane is a translation along a translation vector in said spatial reference system.

A translational displacement should be understood as a linear movement in space of the safety plane. This movement could be relative to a coordinate system centred in or around the robot base, physical objects in the surroundings of the robot, a robot tool or tool flange, etc.

According to an embodiment, said translation vector is a normal vector of said plane.

According to an embodiment, said displacement of said safety plane is a rotation around a rotation vector in said spatial reference system.

A rotational displacement should be understood as rotation around an axis in the spatial reference system. It should be mentioned that a rotation of a safety plane could also be around a point in the special reference system.

According to an embodiment, said rotation vector is a plane vector of lying on said plane.

According to an embodiment, said spatial reference system is a Cartesian coordinate system having an X, an Y and a Z axes.

According to an embodiment, said translation vector is parallel with one of said X, Y and Z axes.

According to an embodiment, said rotation vector is parallel with one of said X, Y and Z axes.

According to an embodiment, said rotation vector has the same origin and direction as a unit vector of one of said X, Y and Z axes.

According to an embodiment, said special reference system is a robot base coordinate system that origins in a robot base reference point.

Using the robot base coordinate system is advantageous in that it has the effect that translation between e.g. coordinates of a safety plane defined in the robot control software is easily transposed to the AR software and vice versa.

According to an embodiment, said displacement of said safety plane is a displacement only in one of the three axes in said robot base coordinate system.

Only displacing in one plane i.e. along one of three axes X, Y and Z in the robot base coordinate system is advantageous in that it has the effect that the complexity of the AR software is reduced and thereby processor requirements at the AR device are reduced.

According to an embodiment, said displacement of said safety plane is a displacement of the complete safety plane in the direction of a normal vector of said safety plane.

This means that if e.g. the safety plane is moved up along the Z axis, the Z value for all pairs of coordinates defining the plane will change, X and Y values will not.

Displacing a complete plane (of which only part is visible in the AR view) is advantageous in that it is not necessary to establish safety plane adjustment points via which the safety plane can be moved such as each corner of a safety plane. Thereby displacement of a safety plane can be done fast and without the risk of not displacing the complete safety plane.

The displacement of the safety plane would typically be in the direction (positive or negative) of a normal vector of a given plane i.e. perpendicular to the extent of the plane. Hence if the plane extends along the X and Y axes, the normal vector would be along the Z axis. Accordingly, only one of the X, Y and Z coordinates for all pairs of coordinates defining the safety plane will change because of the displacement. In this example Z is the only coordinate that changes.

According to an embodiment, said displacement of said safety plane is a displacement of the complete safety plane around one of said X, Y or Z axes.

This means that if e.g. the safety plane is rotated around the Z axis, the X and Y values for all pairs of coordinates will change except the X and Y values of the Z axis the safety plane is rotated around.

Displacing the safety plane around an axis i.e. changing values of the remaining two axes is advantageous in that it has the effect, that the plane does not tilt when displacing it i.e. if parallel to the robot arm before displacement, after displacement the safety plane is still parallel to the robot arm.

According to an embodiment, said displacement of said safety plane is a displacement of the complete safety plane in relation to one point in said Cartesian coordinate system.

This means that if e.g. the safety plane is rotated around a point in space, all values of X, Y and Z of the safety plane are changed except for the X, Y and Z values of the point in space the safety plane is rotated around.

Displacing the safety plane around one point is advantageous in that it has the effect, that the complete safety plane can be displaced along all axes by one movement from the user of the AR device.

According to an embodiment, said displacement is made in steps of at least 1 centimetre, at least 5 centimetres, or at least 10 centimetres.

According to an embodiment, said displacement is made in steps of at least 1 degree, at least 5 degrees, or at least 10 degrees.

According to an embodiment, said displacement is made in steps of 90 degrees.

By a 90 degree rotation, the safety plane can be change from one plane (X, Y, Z) to another. This has the effect, that it is fast to change location of a safety plane from one plane to another. A safety plane may also be copied from one plane and inserted in another plane.

If the safety plane is not parallel and/or perpendicular to one of the planes X, Y and Z, a tab on the display of the AR device will make the safety plane snap to the plane of the X, Y and Z, that is closest to the current location of the safety plane. Further tapping may change position of the safety plane from a location in one plane to a location in another plane. The new location may have the same relative distance to the robot base as the distance from its original location.

It should be mentioned that a location of a safety plane may be stored and thus allow the user to undo a displacement of the safety plane for a simpler and faster adjustment of safety plane(s).

It should be mentioned that the adjustment may be established in joint space i.e. the spatial reference system may refer to a joint space. Hence, the adjustment (creation, moving, rotation, etc.) may be made in joint space, round a joint (axis, shaft, etc.).

According to an embodiment, said user can undo a displacement step.

The possibility to undo a displacement step e.g. be one tab on the display of the AR device is advantageous in that it has the effect, that the last used position is always stored and that the safety plane can be moved back to that location automatically.

According to an embodiment, said displacement of a safety planes requires stop of movement of said robot arm.

Only displacing the safety planes when the robot does not move is advantageous in that it reduces the risk for the user to misunderstand safety settings of the robot such as those defined in the control software.

According to an embodiment, said displacement of a safety plane requires a tab-hold-slide gesture on said physical display of said AR device.

According to an embodiment, a first safety plane and a second safety plane are link so that movement of said first safety plan also moves said second safety plane.

This is advantageous in that then two safety planes may be displaced with one and the same movement. This is furthermore advantageous in that it the two safety planes then can be rotated together around a point in space such as an intersection between the two safety planes.

Note that if two or more planes are defined, they do not need to facilitate same reaction from the robot. Hence, one safety plane may reduce speed of the robot arm while another safety plane may bring the robot in soft stop mode.

According to an embodiment, a safety plane is established via said AR device.

By established should be understood created. The new safety plane may be displayed to the user on the display in a predefined position relative to e.g. the robot base, parallel or perpendicular to the AR device, or similar.

This is advantageous in that it has the effect, that the safety planes can be created from a visual look at the robot and its surroundings via the AR device, which may be implemented as a tablet. The creation can be made by tapping the display in the right menu of the AR software. The extent of the safety plane may be generated automatically by the AR software based on information of the robot. Hence only the distance relative to the robot or physical items should be determined by the user according to an embodiment.

Hence by adjustment, should be understood creation and/or displacement/positioning of the safety plane.

According to an embodiment, said visualization of said safety plane in said physical display is limited to the extent of the reach of said robot arm.

Limiting the extend of the visualization of the safety plane is advantageous in that it has the effect that irrelevant parts of the safety plane, which is theory extends infinite in a plane, are not visualized thereby a more useful and less confusing visualization of the safety plane is established.

According to an embodiment, said virtual environment comprising a safety plane in at least two of the planes of the list comprising X plane, Y plane and Z plane.

A safety plane may be defined according to the plane of the coordinate that changes value when it is displaced. Hence, safety plane may be present in the X, Y and Z planes i.e. along the X, Y or Z axes.

According to an embodiment, two parallel safety planes exist in at least one of the planes of the list comprising X plane, Y plane and Z plane.

Having two parallel safety planes in the same X, Y or Z plane is advantageous in that it has the effect, that the robot trajectories can be limited to a narrow corridor e.g. to limit it trajectories to stay between two sides of a table. Having two parallel safety planes in e.g. both the X and Y planes will limits the movement of the robot arm to a box like space e.g. defined by the four sides of a table. Adding a safety plane in the Z plane will close this boxlike working space for the robot arm.

According to an embodiment, said safety plane is imported from said robot controller.

According to an embodiment, said safety plane is created via said physical display of said AR device and when approved by a user uploaded to said robot controller.

According to an embodiment, said AR device receives robot identifying information from said robot controller.

This is advantageous in that it has the effect, that e.g. dimension of the robot are is then known by the AR device. Further, information used to communicatively connect the AR device and the robot controller may also be provided from the robot to the AR device.

According to an embodiment, said robot is a robot arm or an automated guide vehicle An industrial robot arm can be any robotic arm e.g. big heavy robots or small light weight robots, which can be run in collaborative mode.

According to an embodiment, a safety plane is automatically associated with a real-world item recorded by the AR device.

Automatically create a safety plane associated with a e.g. a table recorded by the AR device is advantageous in that the use does not need to create the safety plane. The user may need to perform an adjustment of the automatically created safety plane.

The creation of a safety plane via the AR device may automatically position the safety plane in line with a physical item such as a table within reach of the robot arm. Based on the recording of the surroundings the AR software may be suggest a given height of a Z plane safety plane, in continuation of a table surface, parallel or perpendicular to a table surface, or the like.

According to an embodiment, the location of an area scanner in the virtual environment is determined.

According to an embodiment, said area scanner and said AR device are communicatively connected.

This is advantageous in that it has the effect, that the area scanned by the area scanner can be visualize on the display. Further, if the area scanner is communicatively connected to the AR device, the user is able to adjust the area scanned by the area scanner via the visualized scanning area on the display of the AR device.

According to an embodiment, said virtual environment comprises at least one safety plane.

According to an embodiment, the invention relates to a method according to the description in paragraphs labeled above as “¶AA” above to this paragraph implemented on a robot system according to the description in the next paragraph to the paragraph labeled "¶BB" below. (¶CC)

Moreover, an aspect of the invention relates to a system for AR assisted adjustment of a safety plane for a robot, the system comprises: a robot controller configured for: controlling the robot and establish a spatial reference system defined with reference to the robot. An AR device, having a physical display and camera, configured for: communicatively connecting to the robot controller, record the surroundings of the portable device including the robot via the camera and display the recording of the surroundings on the physical display, and establish a virtual environment according to the spatial reference system; and displaying the virtual environment on the physical display by overlaying the virtual environment the recorded surroundings. Wherein the virtual environment comprises the safety plane and a user, via the physical display, is able to perform a displacement of the safety plane in the spatial reference system in the virtual environment and transfer the displaced location of the safety plane to the robot controller.

The robot system as described above in the immediately preceding paragraph may be controlled according to the method described in any of the paragraphs from the paragraph labeled "¶AA" above to the paragraph labeled "¶CC" above.

According to an embodiment, the special reference system is a robot base coordinate system that origins in a robot base reference point.

According to an embodiment, the displacement of the safety plane is a displacement only in one of the three axes in the robot base coordinate system.

According to an embodiment, the displacement of the safety plane is a displacement of the complete safety plane in the direction of a normal vector of the safety plane.

According to an embodiment, the displacement of a safety planes requires stop of movement of the robot arm.

According to an embodiment, a safety plane is established via the AR device.

According to an embodiment, the visualization of the safety plane in the physical display is limited to the extent of the reach of the robot arm.

According to an embodiment, two parallel safety planes exist. The two parallel safety planes may exist in relation to the robots and the two parallel safety planes may for instance exist at least one of the planes of the list comprising X plane, Y plane and Z plane.

According to an embodiment, a safety plane is automatically associated with a real-world item recorded by the AR device.

According to an embodiment, the robot is a robot arm.

According to an embodiment, the robot is an automated guided vehicle. (¶BB)

THE DRAWINGS

Figure 2:
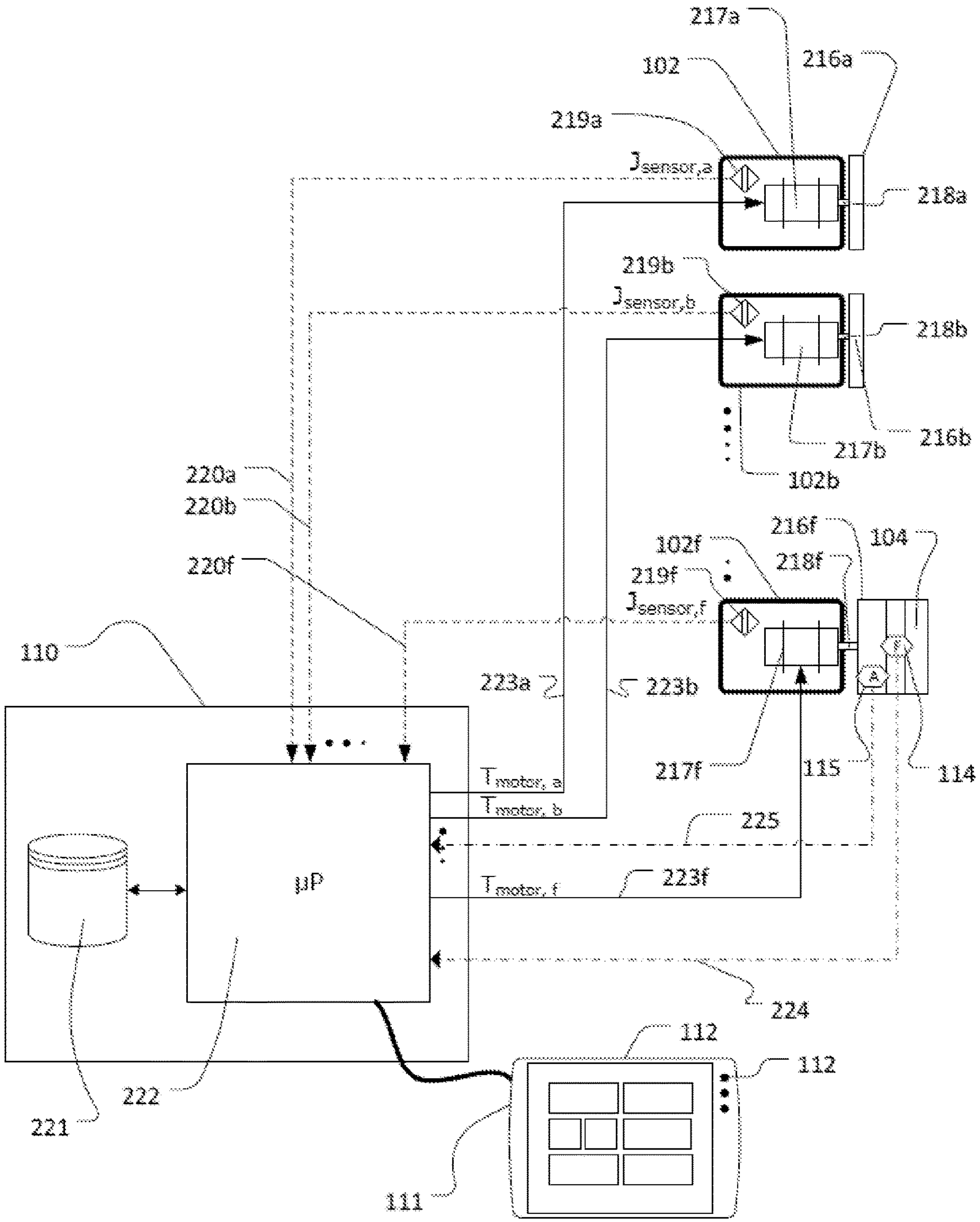
Figure 3:
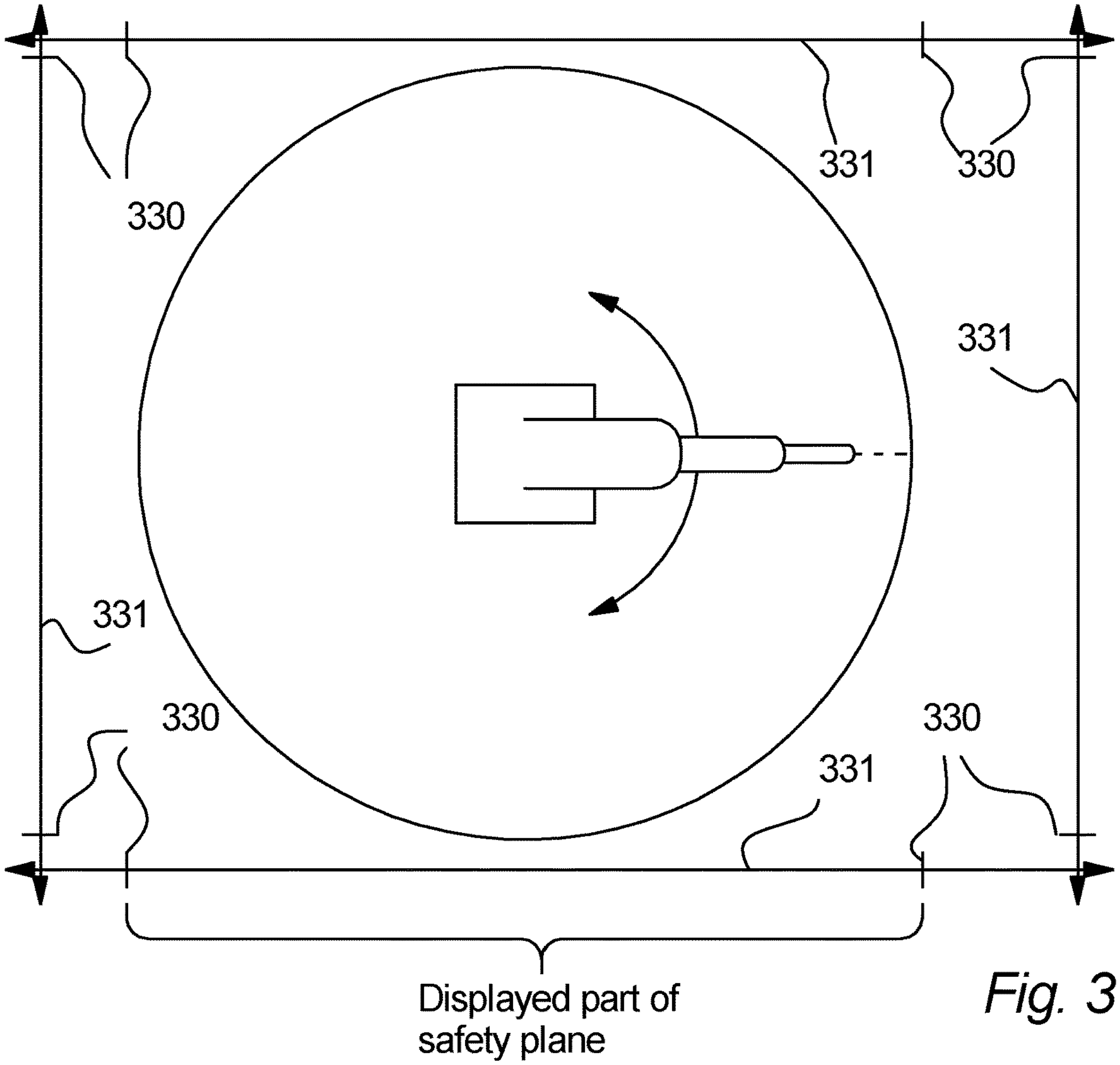
Figure 4:
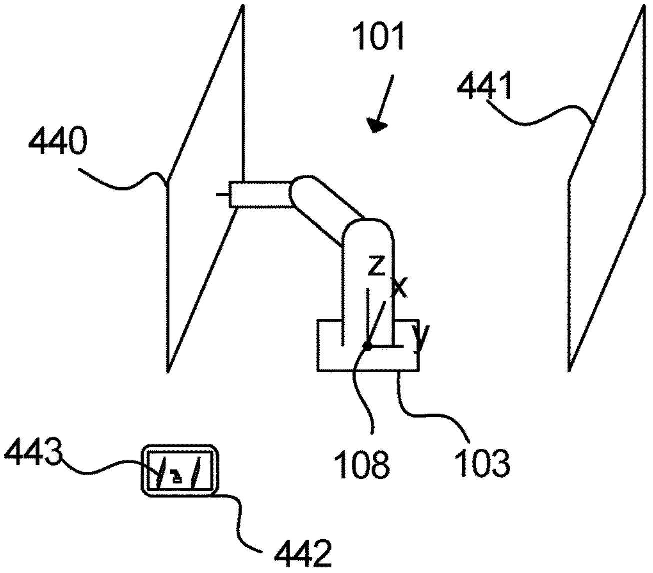
Figure 6:
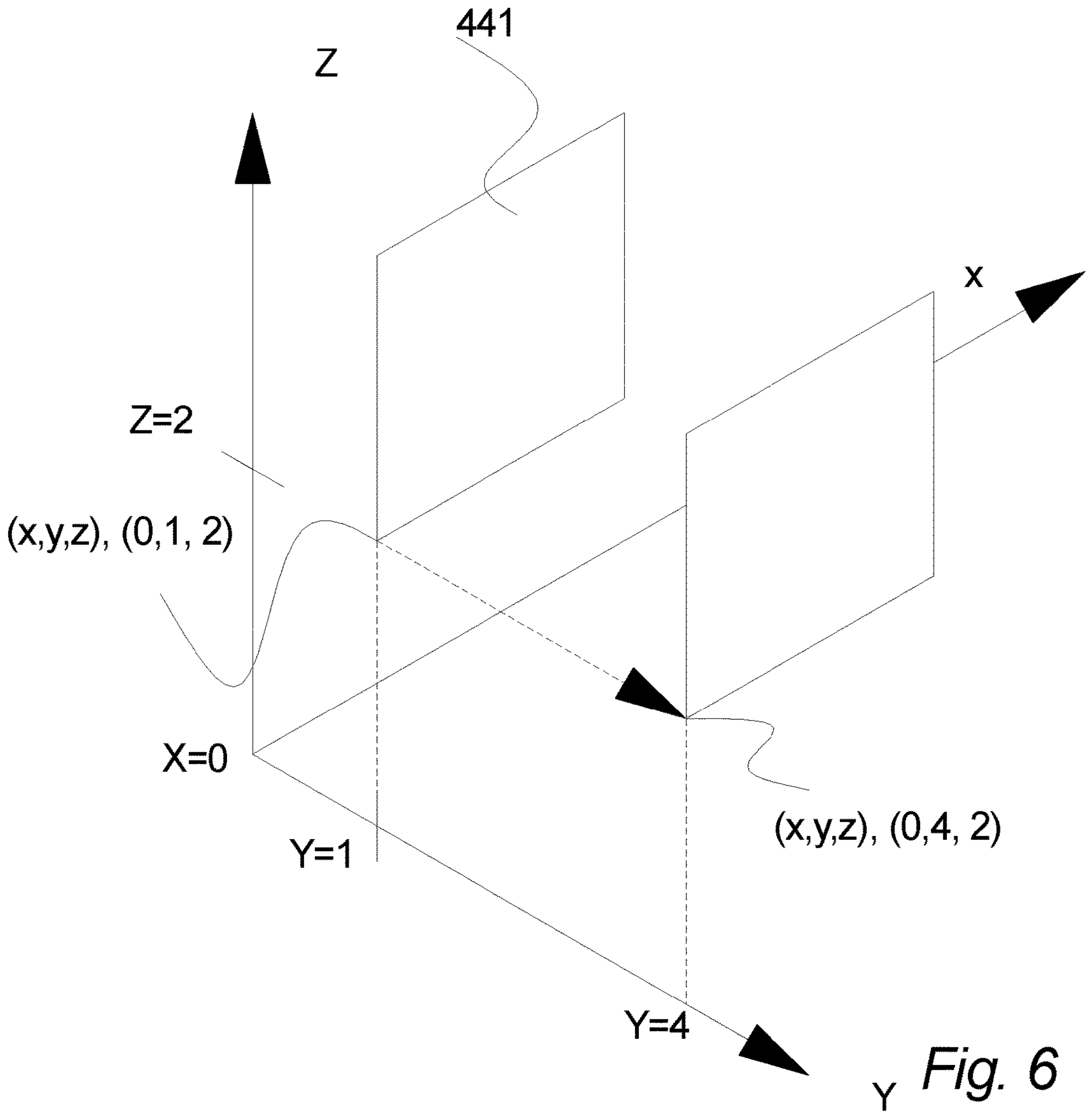
Figure 5:
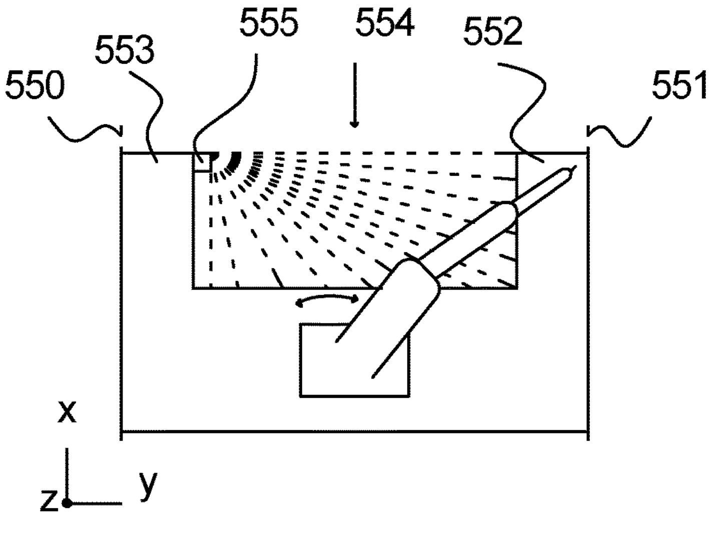
Figure 7:
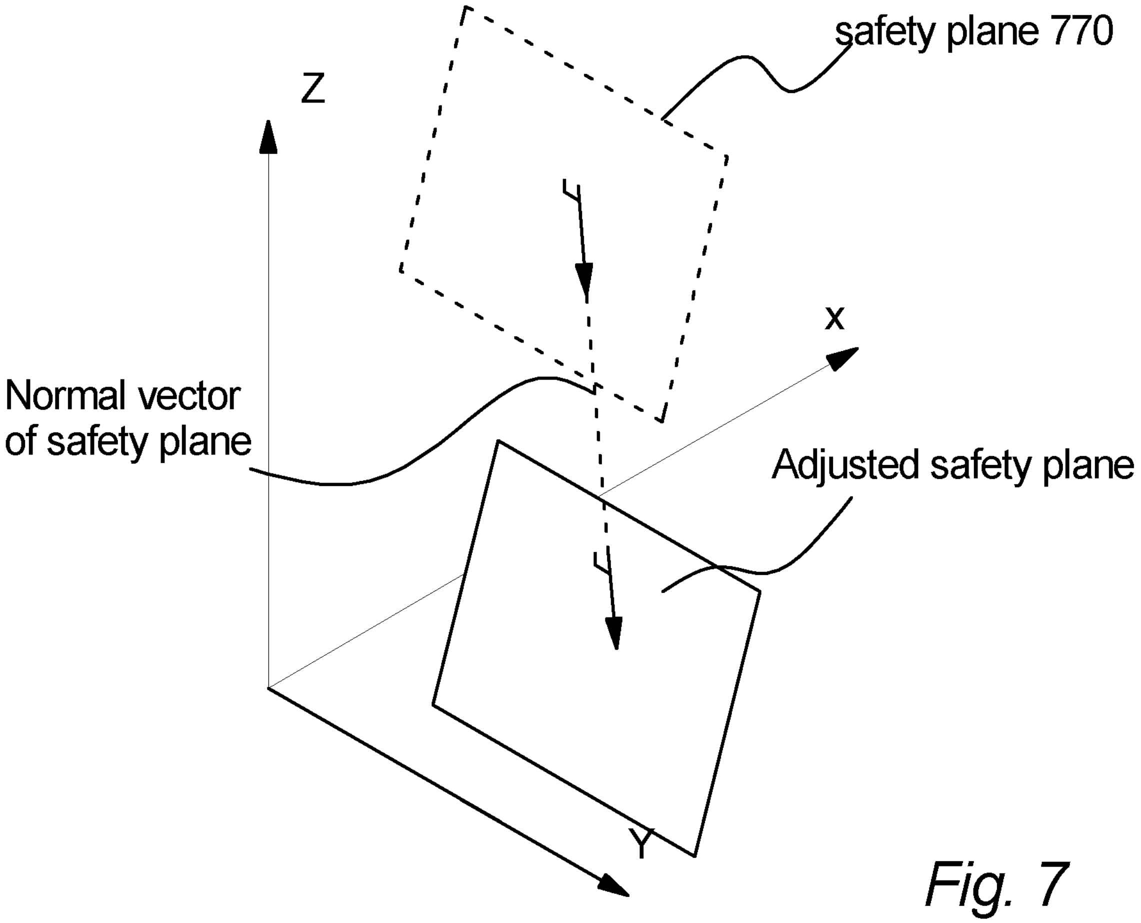
Figure 8:
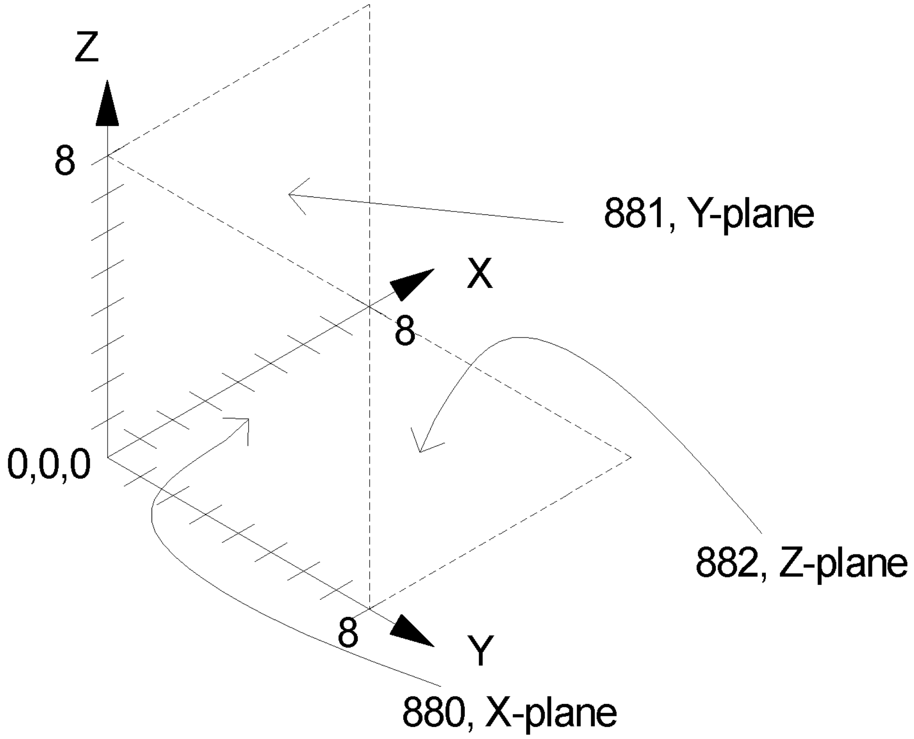
Figure 13:
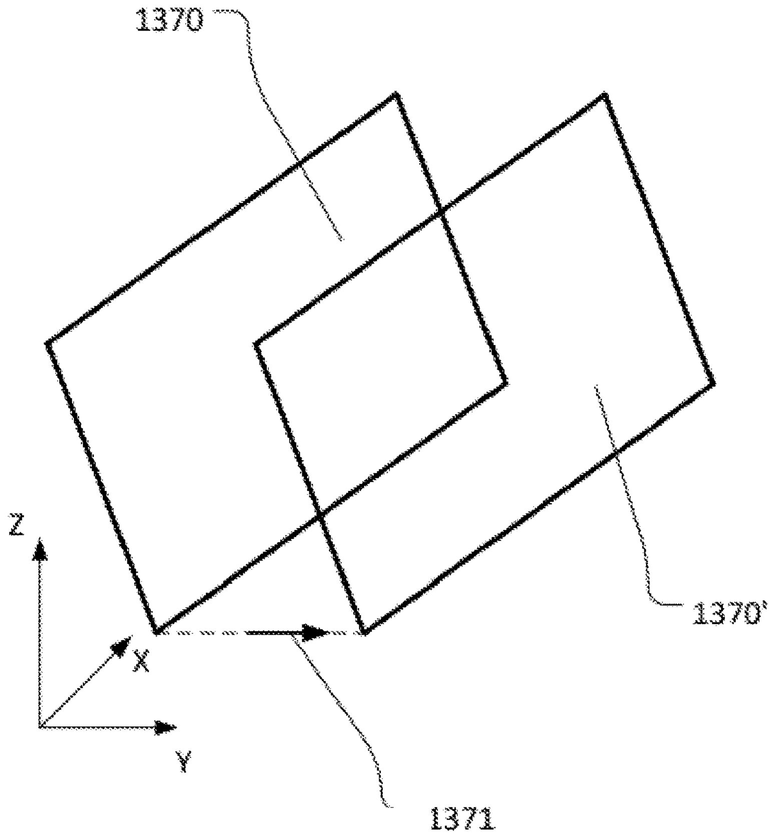
Figure 14:
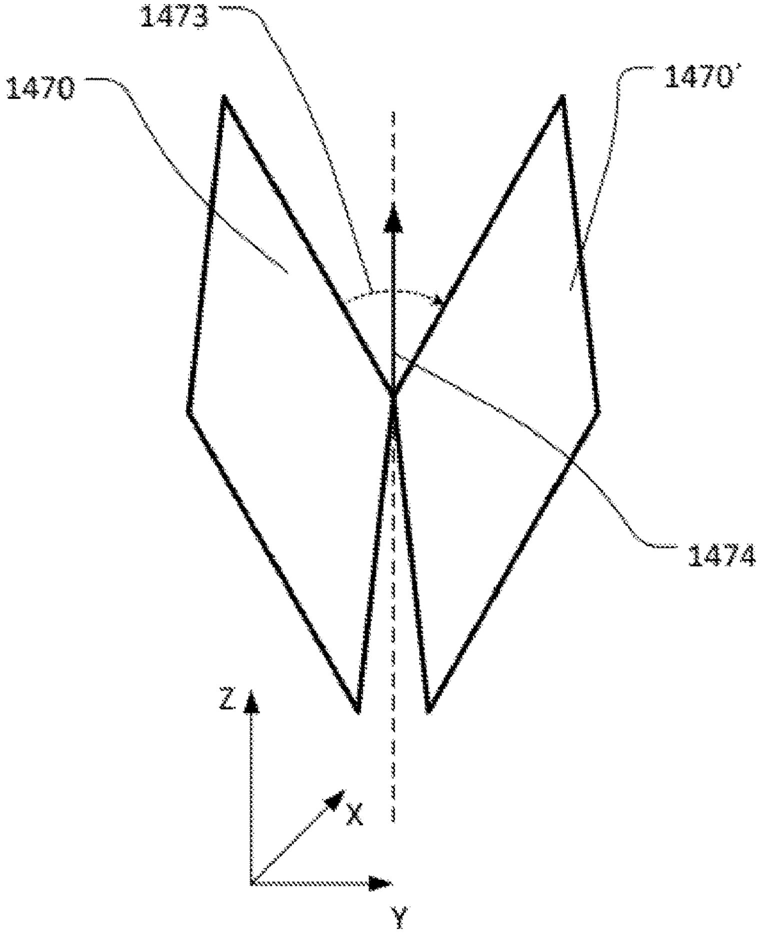
Figure 15A:
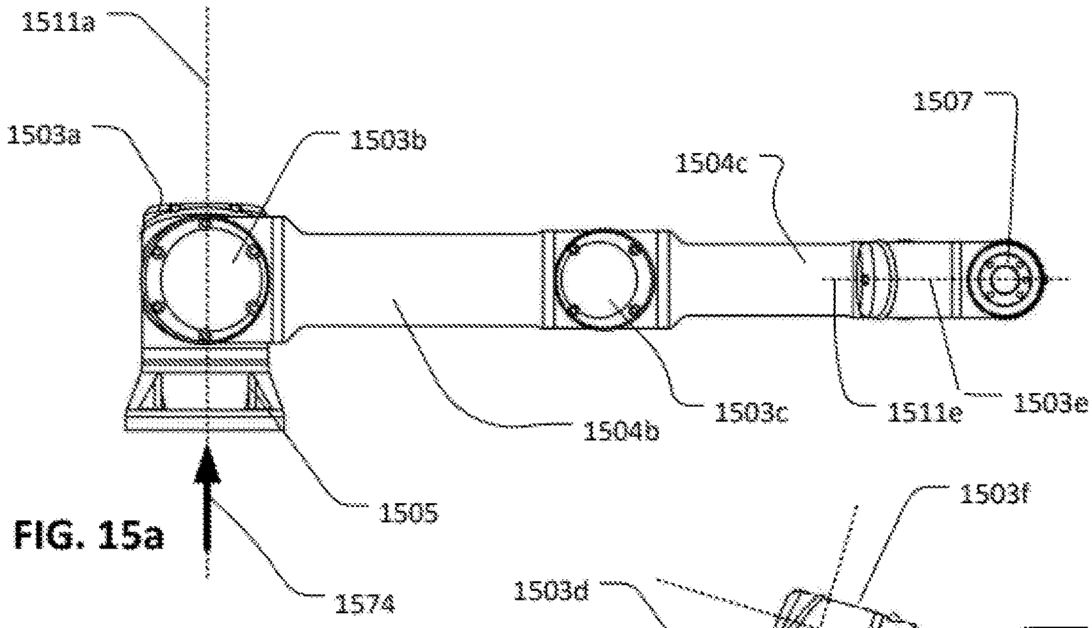
Figure 15B:
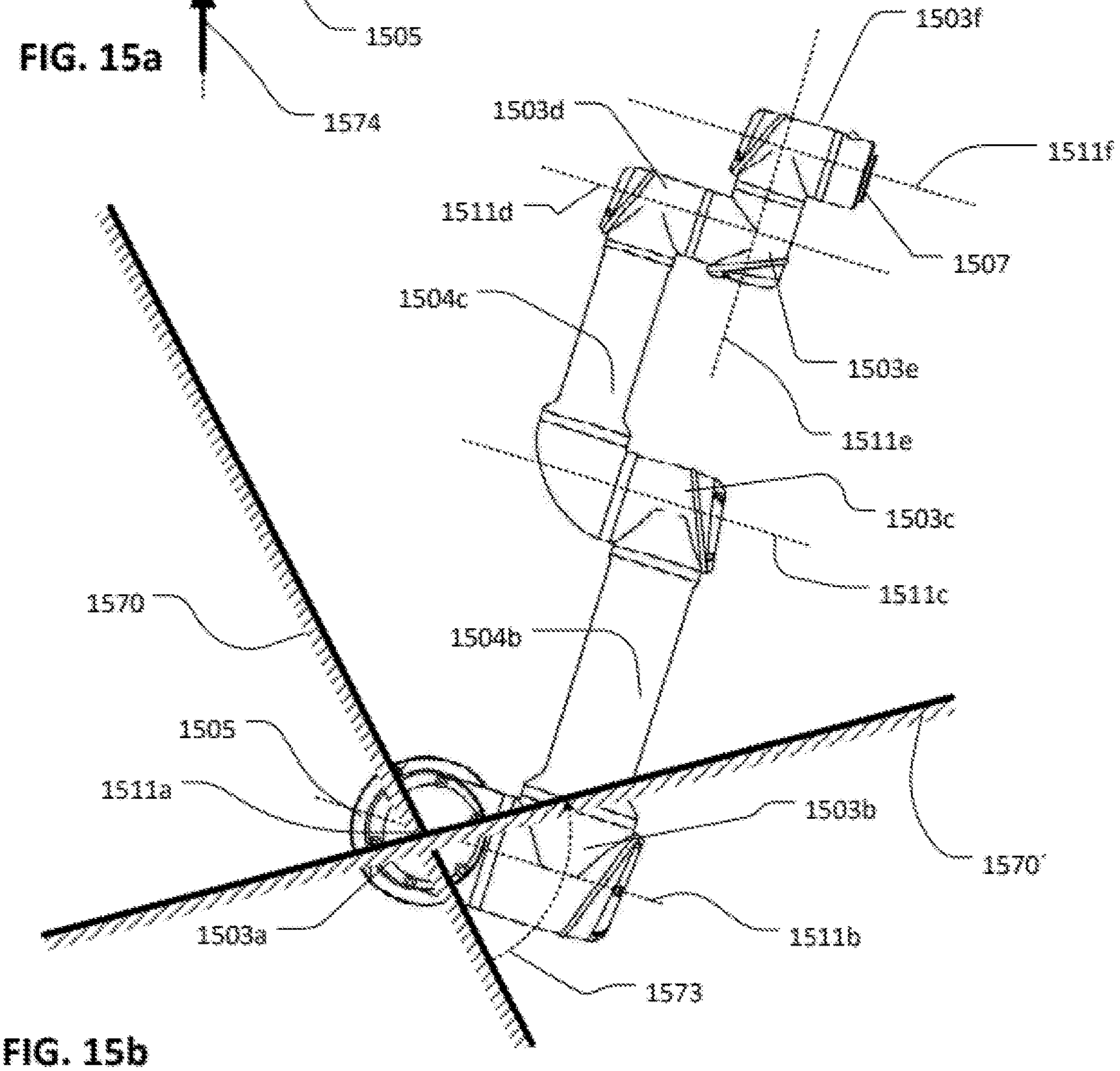

For a more complete understanding of this disclosure, reference is now made to the following brief description, taken in connection with the accompanying drawings and detailed description, wherein like reference numerals represent like parts:

FIG. 1 illustrates a robot arm according to the present invention,

FIG. 2 illustrates a simplified structural diagram of the robot arm and part of the robot controller, FIG. 3 illustrates safety planes and reach of a robot arm, FIG. 4 illustrates a robot in a side view having safety planes, FIG. 5 illustrates a robot in a top view having safety planes and an area scanner, FIG. 6 illustrates displacement of a safety plane in space, FIG. 7 illustrates displacement of a safety plane in space, FIG. 8 illustrates a Cartesian coordinate system having a X, Y and a Z plane, FIG. 9-14 illustrates various examples of safety plane adjustment, and FIGS. 15*a* and 15*b* illustrates a robot arm and associated robot axis.

DETAILED DESCRIPTION

The present invention is described in view of exemplary embodiments, only intended to illustrate the principles of the present invention. The skilled person will be able to provide several embodiments not disclosed in this document within the scope of the claims.

FIG. 1 illustrates a robot arm 101 comprising a plurality of robot joints 102*a*, 102*b*, 102*c*, 102*d*, 102*e*, 102*f* connecting a robot base 103 and a robot tool flange 104. A base joint 102*a* is configured to rotate the robot arm 101 around a base axis 105*a* (illustrated by a dashed dotted line) as illustrated by rotation arrow 106*a*; a shoulder joint 102*b* is configured to rotate the robot arm around a shoulder axis 105*b* (illustrated as a cross indicating the axis) as illustrated by rotation arrow 106*b*; an elbow joint 102*c* is configured to rotate the robot arm around an elbow axis 105*c* (illustrated as a cross indicating the axis) as illustrated by rotation arrow 106*c*, a first wrist joint 102*d* is configured to rotate the robot arm around a first wrist axis 105*d* (illustrated as a cross indicating the axis) as illustrated by rotation arrow 106*d* and a second wrist joint 102*e* is configured to rotate the robot arm around a second wrist axis 105*e* (illustrated by a dashed dotted line) as illustrated by rotation arrow 106*e*. Robot joint 102*f* is a tool joint comprising the robot tool flange 104, which is rotatable around a tool axis 105*f* (illustrated by a dashed dotted line) as illustrated by rotation arrow 106*f*. The illustrated robot arm is thus a six-axes robot arm with six degrees of freedom with six rotational robot joints, however it is noticed that the present invention can be provided in robot arms comprising less or more robot joints and also other types of robot joints such as prismatic robot joints providing a translation of parts of the robot arm for instance a linear translation.

A robot tool flange reference point 107 also known as a Tool Center Point (TCP) is indicated at the robot tool flange and defines the origin of a tool flange coordinate system defining three coordinate axes $x_{flange}$, $y_{flange}$, $z_{flange}$. In the illustrated embodiment the origin of the robot tool flange coordinate system has been arrange on the tool flange axis 105*f* with one axis ($z_{flange}$) parallel with the tool flange axis and with the other axis $x_{flange}$, $y_{flange}$ parallel with the outer surface of the robot tool flange 104. Further a base reference point 108 is coincident with the origin of a robot base coordinate system defining three coordinate axes $x_{base}$, $y_{base}$, $z_{base}$. In the illustrated embodiment the origin of the robot base coordinate system has been arrange on the base axis 105*a* with one axis ($z_{base}$) parallel with the base axis 105*a* and with the other axes $x_{base}$, $y_{base}$ parallel with the bottom surface of the robot base. The coordinate systems illustrated in FIG. 1 are right-handed coordinates systems, however it is to be understood that the coordinate systems also can be defied as left-handed coordinates systems and that left-handed coordinate systems may be used in the other drawings. The direction of gravity 109 in relation to the robot arm is also indicated by an arrow and it is to be understood that the robot arm can be arrange at any position and orientation in relation to gravity.

Note that points and positions in the Cartesian coordinate system may be defined or referred to as pairs of coordinates, triples of coordinates, Cartesian coordinates, etc.

The robot arm comprises at least one robot controller 110 configured to control the robot arm 101 and can be provided as a computer comprising in interface device 111 enabling a user to control and program the robot arm. The controller 110 can be provided as an external device as illustrated in FIG. 1 or as a device integrated into the robot arm or as a combination thereof. The interface device can for instance be provided as a teach pendant as known from the field of industrial robots which can communicate with the controller 110 via wired or wireless communication protocols. The interface device can for instanced comprise a display 112 and a number of input devices 113 such as buttons, sliders, touchpads, joysticks, track balls, gesture recognition devices, keyboards etc. The display may be provided as a touch screen acting both as display and input device. The interface device can also be provided as an external device configured to communicate with the robot controller 110, for instance as smart phones, tablets, PCs, laptops, etc.

The robot tool flange 104 comprises a force-torque sensor 114 (sometimes referred to simply as fore sensor) integrated into the robot tool flange 104. The force-torque sensor 114 provides a tool flange force signal indicating a force-torque provided at the robot tool flange. In the illustrated embodiment the force-torque sensor is integrated into the robot tool flange and is configured to indicate the forces and torques applied to the robot tool flange in relation to the robot tool flange reference point 107. The force sensor 114 provides a force signal indicating a force provided at the tool flange. In the illustrated embodiment the force sensor is integrated into the robot tool flange and is configured to indicate the forces and torques applied to the robot tool flange in relation to the reference point 107 and in the tool flange coordinate system. However, the force-torque sensor can indicate the force-torque applied to the robot tool flange in relation to any point which can be linked to the robot tool flange coordinate system. In one embodiment the force-torque sensor is provided as a six-axes force-torque sensor configured to indicate the forces along and the torques around three perpendicular axes. The force-torque sensor can for instance be provided as any force-torque sensor capable of indicating the forces and torques in relation to a reference point for instance any of the force-torque sensors disclosed by WO2014/110682A1, U.S. Pat. No. 4,763,531, US2015204742. However, it is to be understood that the force sensor in relation to the present invention not necessarily need to be capable of sensing the torque applied to the tool sensor. It is noted that the force-torque sensor may be provided as an external device arranged at the robot tool flange or omitted.

An acceleration sensor 115 is arranged at the robot tool joint **102*f* and is configured to sense the acceleration of the robot tool joint 102*f* and/or the acceleration of the robot tool flange 104. The acceleration sensor 115 provides an acceleration signal indicating the acceleration of the robot tool joint 102*f* and/or the acceleration of the robot tool flange 104**. In the illustrated embodiment the acceleration sensor is integrated into the robot tool joint and is configured to indicate accelerations of the robot tool joint in the robot tool coordinate system. However, the acceleration sensor can indicate the acceleration of the robot tool joint in relation to any point which can be linked to the robot tool flange coordinate system. The acceleration sensor can be provided as any accelerometer capable of indicating the accelerations of an object. The acceleration sensor can for instance be provided as an IMU (Inertial Measurement Unit) capable of indicating both linear acceleration and rotational accelerations of an object. It is noted that the acceleration sensor may be provided as an external device arranged at the robot tool flange or omitted.

Each of the robot joints comprises a robot joint body and an output flange rotatable or translatable in relation to the robot joint body and the output flange is connected to a neighbour robot joint either directly or via an arm section as known in the art. The robot joint comprises a joint motor configured to rotate or translate the output flange in relation to the robot joint body, for instance via a gearing or directly connected to the motor shaft. The robot joint body can for instance be formed as a joint housing and the joint motor can be arranged inside the joint housing and the output flange can extend out of the joint housing. Additionally, the robot joint comprises at least one joint sensor providing a sensor signal indicative of at least one of the following parameters: an angular and/or linear position of the output flange, an angular and/or linear position of the motor shaft of the joint motor, a motor current of the joint motor or an external force and/or torque trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor. It is also noted that some of the robot joints may comprise a plurality of output flanges rotatable and/or translatable by joint actuators, for instance one of the robot joints may comprise a first output flange rotating/translating a first part of the robot arm in relation to the robot joint and a second output flange rotating/translating a second part of the robot arm in relation to the robot joint.

The robot controller 110 is configured to control the motions of the robot arm by controlling the motor torque provided to the joint motors based on a dynamic model of the robot arm, the direction of gravity acting 109 and the joint sensor signal.

FIG. 2 illustrates a simplified structural diagram of the robot arm 101 illustrated in FIG. 1. The robot joints **102*a*, 102*b* and 102*f* have been illustrated in structural form and the robot joints 102*c*, 102*d*, 102*e* and the robot links connecting the robot joints have been omitted for the sake of simplicity of the drawing. Further the robot joints are illustrated as separate elements however it is to be understood that they are interconnected as illustrated in FIG. 1. The robot joints comprise an output flange 216*a*,216*b*,216*f* and a joint motor 217*a*, 217*b*, 217*f* or another kind of actuator, where the output flange 216*a*,216*b*,216*f* is rotatable in relation to the robot joint body. The joint motors 217$a$, 217$b$, 217$f$ are respectively configured to rotate the output flanges 216$a$, 216$b$, 216$f$ via an output axle 218$a$, 218$b$, 218$f$. It is to be understood that the joint motor or joint actuator may be configured to rotate the output flange via a transmission system such as a gear (not shown). In this embodiment the output flange 216$f$ of the tool joint 123$f$ constitutes the tool flange 104. At least one joint sensor 219$a$, 219$b$, 219$f$ providing a sensor signal 220$a$, 220$b$, 220**$f$ indicative of at least one joint sensor parameter $J_{sensor,a}$, $J_{sensor,b}$, $J_{sensor,f}$ of the respective joint. The joint sensor parameter can for instance indicate a pose parameter indicating the position and orientation of the output flange in relation to the robot joint body, an angular position of the output flange, an angular position of a shaft of the joint motor, a motor current of the joint motor. For instance, the angular position of the output flange can be indicated by an output encoder such as optical encoders, magnetic encoders which can indicate the angular position of the output flange in relation to the robot joint. Similar, the angular position of the joint motor shaft can be provided by an input encoder such as optical encoders, magnetic encoders which can indicate the angular position of the motor shaft in relation to the robot joint. The motor currents can be obtained and indicated by current sensors.

The robot controller 110 comprises a processer 220 and memory 221 and is configured to control the joint motors of the robot joints by providing motor control signals 224, 225, 223$f$ to the joint motors. The motor control signals 224, 225, 223$f$ are indicative of the motor torque $T_{motor,a}$, $T_{motor,\ b}$, and $T_{motor,f}$ that each joint motor shall provide to the output flanges and the robot controller 110 is configured to determine the motor torque based on a dynamic model of the robot arm as known in the prior art. The dynamic model makes it possible for the controller 110 to calculate which torque the joint motors shall provide to each of the joint motors to make the robot arm perform a desired movement. The dynamic model of the robot arm can be stored in the memory 221 and be adjusted based on the joint sensor parameters $J_{sensor,a}$, $J_{sensor,b}$, $J_{sensor,f}$ For instance, the joint motors can be provided as multiphase electromotors and the robot controller 110 can be configured to adjust the motor torque provided by the joint motors by regulating the current through the phases of the multiphase motors as known in the art of motor regulation.

Robot tool joint 102$f$ comprises the force sensor 114 providing a tool flange force signal 224 indicating a force-torque $FT_{flange}$ provided to the tool flange. For instance, the force signal-torque $FT_{flange}$ can be indicated as a force vector $$\overrightarrow{F_{sensor}^{flange}}$$

and a torque vector $$\overrightarrow{T_{sensor}^{flange}}$$

in the robot tool flange coordinate system:

$$\overrightarrow{F_{sensor}^{flange}} = \begin{pmatrix} F_{x,sensor}^{flange} \\ F_{y,sensor}^{flange} \\ F_{z,sensor}^{flange} \end{pmatrix} \quad \text{eq. 1}$$

where $$F_{x,sensor}^{flange}$$

is the indicated force along the $x_{flange}$ axis, $$F_{y,sensor}^{flange}$$

is the indicated force along the $y_{flange}$ axis and $$F_{z,sensor}^{flange}$$

is the indicated force along the $z_{flange}$ axis.

In addition to the above, the robot controller 110 of the present invention may include a PLC code import/translate module (not illustrated). Such module facilitates importing PLC code stored e.g. on a PLC or on a PLC code developing tool connected to the robot controller either directly (e.g. wired or wireless connection) or indirectly (via e.g. the internet). Further, such module may facilitate translation of the PLC code to robot control software executable the robot controller.

In an embodiment where the force sensor is provided as a combined force-torque sensor the force-torque sensor can additionally also provide a torque signal indicating the torque provide to the tool flange, for instance as a separate signal (not illustrated) or as a part of the force signal. The torque can be indicated as a torque vector in the robot tool flange coordinate system:

$$\overrightarrow{T_{sensor}^{flange}} = \begin{pmatrix} T_{x,sensor}^{flange} \\ T_{y,sensor}^{flange} \\ T_{z,sensor}^{flange} \end{pmatrix} \quad \text{eq. 2}$$

where $$T_{x,sensor}^{flange}$$

is the indicated torque around the $x_{flange}$ axis, $$T_{y,sensor}^{flange}$$

is the indicated torque around the $y_{flange}$ axis and $$T_{z,sensor}^{flange}$$

is the indicated torque around the $z_{flange}$ axis.

Robot tool joint 102$f$ comprises the acceleration sensor 115 providing an acceleration signal 225 indicating the acceleration of the robot tool flange where the acceleration may be indicated in relation to the tool flange coordinate system $$\overrightarrow{A_{sensor}^{flange}} = \begin{pmatrix} A_{x,sensor}^{flange} \\ A_{y,sensor}^{flange} \\ A_{z,sensor}^{flange} \end{pmatrix}$$

where $$A_{x,sensor}^{flange}$$

is the sensed acceleration along the $x_{flange}$ axis, $$A_{y,sensor}^{flange}$$

is the sensed acceleration along the $y_{flange}$ axis and $$A_{z,sensor}^{flange}$$

is the sensed acceleration along the $z_{flange}$ axis.

In an embodiment where the acceleration sensor is provided as a combined accelerometer/gyrometer (e.g. an IMU) the acceleration sensor can additionally provide an angular acceleration signal indicating the angular acceleration of the output flange in relation to the robot tool flange coordinate system, for instance as a separate signal (not illustrated) or as a part of the acceleration signal. The angular acceleration signal can indicate an angular acceleration vector $$\overrightarrow{\alpha_{sensor}^{flange}}$$

in the robot tool flange coordinate system $$\overrightarrow{\alpha_{sensor}^{flange}} = \begin{pmatrix} \alpha_{x,sensor}^{flange} \\ \alpha_{y,sensor}^{flange} \\ \alpha_{z,sensor}^{flange} \end{pmatrix} \quad \text{eq. 3}$$

where $$\alpha_{x,sensor}^{flange}$$

is the angular acceleration around the $x_{flange}$ axis, $$\alpha_{y,sensor}^{flange}$$

is the angular acceleration around the $y_{flange}$ axis and $$\alpha_{z,sensor}^{flange}$$

is the angular acceleration around the $z_{flange}$ axis.

The force sensor and acceleration sensor of the illustrated robot arm are arranged at the robot tool joint **102*f***; however, it is to be understood that the force sensor and acceleration sensor can be arrange at any part of the robot arm and that a plurality of such sensors can be provided at the robot arm.

A robot controller 110 according to an embodiment of the present invention is divided in a safety controller and in a process controller. This split of functionality can be physical or the same controller may facilitate both functions. A typical reference to a robot controller in this document is a reference to the process controller.

The process controller/control part is responsible for executing the robot control software and thereby the moving of the robot joints and thus the robot arm. Included in the robot control software are adjustable limits for speed, acceleration, force, torque, prohibited areas, safety zones, etc. Hence, in the normal scenario, the process controller is controlling the robot arm within these limits and stop operation of the robot arm if limits are crossed e.g. by an unexpected interaction with a fixture, person or workpiece.

The safety controller/control part is monitoring the operation of the robot arm to ensure that operation is within the limits provided by the robot control software. The safety control software has similar limits however, the range of allowed operation may be wider within the limits of the safety control software compared to the robot control software. This is because during normal operation it is the process controller that should e.g. stop operation. In the situation where the process controller fails to do so and the robot arm continues operation and crosses the limit specified in the robot control software further the safety controller stops operation of the robot when the limit in the safety control software is crossed/reached.

Alternatively, or in addition, the safety controller calculates a future position of the robot arm based on current position, speed and/or acceleration. If this calculation results in a movement of the robot arm, within a calculated time to stop, that will move the robot arm to a limit such as a safety plane, the safety controller overrules the control of the process controller and stops the movement of the robot arm at least when it reaches the limit, but preferably before it reaches the limit.

A limit such as a safety plane is stored as part of or as parameters used by the robot control software and are used by both the process and safety controller as mentioned above.

In an embodiment, the robot is not in operation while the robot is programmed or at least while the safety plane is created or displaced. Accordingly, the adjustment (also referred to as displacement) of an existing safety plane in this embodiment requires an update and restart of the robot controller, typically the safety controller hereof. This is however, no problem in that when first the safety plane is established, often it does not need to be adjusted.

Since a displacement of a safety plane is related to safety, the displacement is protected e.g. by a password so that not everyone with access to the robot control software is allowed to change or create a safety plane. A further safety measure associated with the establishing of a safety plane is the establishing of a checksum e.g. of the coordinates defining the location of the safety plane in the robot base coordinate system. In this way it is possible to quickly determine if any changes have been made to the robot control software including the position of a safety plane.

A stop initiated by the process controller can be a so-called soft stop from which the robot controller can start up again whereas a stop initiated by the safety controller is a so-called hard stop that may require restart of the robot control software to start-up operation of the robot arm again.

In principle, a safety plane extends infinite in space, but since the robot arm has a limited reach only the part of the safety plane relevant for the reach of the robot arm is relevant to display to a user on the display of the portable AR device.

Further in principle, since a safety plane is software generated, it may exist is a plurality of dimensions such as e.g. six dimensions. However, not all are relevant to display to the user, thus either the user is able to select the level of details of a safety plane to view or the level of details of a safety plane that is possible to visualize is predetermined. No matter how, the level of details may be determined during configuration of the AR device.

In the same way the part of the safety plane that is visible to the user may be determined during configuration of the AR device. The visual part of the safety plane may also be determined automatic based on the reach of the robot and/or obstacles in the robot surroundings.

Accordingly, from the perspective of the robot, reshaping or resizing of a safety plane is not important, however from a user perspective this may be relevant to be able to maintain overview of all aspects related to the robot in the AR view According to an embodiment of the invention, one or more safety planes may be established in an AR environment via the AR device. These safety planes and how much of these safety plans that is visible may be established and displaced via the AR device.

Hence, one safety plane may be established and displaced (e.g. moved away from or towards the robot, rotated relative to the robot). A virtual robot may be moved in the AR environment to test the location of the safety plane or the real robot may be moved to test the location of the safety plane. It should be noted that in the AR view it is possible to determine and display to the user distances between a safety plane and object in the view such as between a robot tool center point and a safety plane, simulated or real payload and safety plane, safety plane and obstacle (such as e.g. human passage, table, conveyer, etc.) and the like. When the user is satisfied, the first safety plane is stored temporary in a memory of the AR device. In the same way all needed safety plans are established and/or modified and temporary stored.

The coordinates of the temporary stored safety planes are then translated to coordinates of the coordinate system according to which the robot is controlled. The translation may be performed by the AR device or by the robot controller.

Accordingly in an embodiment, the steps of establishing and subsequently displacing a safety plan by means of the AR device, translation and transfer of safety plan coordinates to the robot controller is performed.

It should be mentioned that since the safety planes are part of the safety system of the robot only a selected group of users should be allowed to establish and/or displace a safety plane. Hence, access to the AR device or at least to transfer of temporary stored safety planes to the robot controller may be restricted. Accordingly, one user may establish and displace a safety plane and another with appropriate approvals may be responsible for transferring and implementing.

In an embodiment, establishing or displacing a safety wall may require restart of the robot controller.

The reach of the robot and examples of safety planes are illustrated on FIG. 3. Here safety planes along the X and Y axes and a robot arm are illustrated seen from above. The safety planes 331 are illustrated with arrows indicating that they in principle extends infinite. The small lines crossing denoted 330 the safety planes indicated the part of the safety planes that are displayed. The stipulated lined at the end of the robot arm illustrates a robot tool.

As mentioned, the AR software receive information about the robot e.g. when scanning a QR code. Based on this information the AR software known the reach of the robot arm (which may be reduced in dependency of payload weight). Accordingly, when determining how much of the infinite safety plane that should be displayed on the display 443, the default view is reach of the robot arm. This may of course be a user defined feature also the weight of the payload may be user defined.

If the reach of the robot along the Z axis is 180 cm from reference point 108 of FIG. 1, the default distance of the safety plane may be 180 cm in the direction of the normal vector of the Z plane. Note that additional distance may be added if a tool may reach further than the robot arm without tool.

Note that a safety plane may in principle have any geometry/shape that can be defined in a 2-dimension plane for instance triangles, quadrangle, rectangles, polygons, circles, ecliptics combinations thereof or any other 2-dimensional shape. Adjustment according to an embodiment of this invention should be understood moving the safety plane according to a normal vector of the safety plane. It should be mentioned that it may also be possible to adjust the radius of a circle if the safety plane has this geometry.

FIG. 4 illustrates a side view of a robot arm 101 restricted by a first safety plane 440 and by a second safety plane 441. As seen the robot arm 101 is seen in a side view along the X axis, whereas the safety planes 440, 441 are rotated a bit to illustrate that it is planes. In a real side view, the safety planes 440, 441 would be straight lines. These safety planes extend upwards along the Z axis spaced from the robot base in along the X axis. Thus, a safety plane according to an embodiment is a 2-dimensional virtual wall defined by coordinates in a spatial reference system such as the robot base coordinate system or the robot tool flange coordinate system. The safety planes are virtual meaning that they exists/are defined in the robot control software and therefore can be displayed virtual on the AR device display, but do not exist physically.

A portable AR device 442 having a physical display 443 is illustrated as a tablet. It should be mentioned that almost any device including smartphones, teach pendant, tablet, etc. can be used as an AR device according to this invention. A requirement thus is that the AR device need to have a camera. The AR device may be wired or wireless connected to the robot controller.

The safety plane(s) are defined in the robot control software and ensuring that the robot arm 101, robot tool, robot joints, workpiece handled by the robot tool, etc. does not pass the coordinates defining the safety plane or change operation if passed. In principle, a safety plane can be created as any plane in the spatial reference system. However, it is often most relevant in the plane defined by one of the three coordinate axes $x_{base}$, $y_{base}$, $z_{base}$ of the robot base coordinate system. Hence, the $z_{base}$ plane could be parallel to a table on which the robot base is located or a fixture above the robot arm 101. A safety plane in the Z plane could be protecting from collision with the table, fixtures, etc. below or above the robot arm 101. The $y_{base}$ and $x_{base}$ planes could be parallel to the robot arm 101 (perpendicular to the Z plane) as illustrated e.g. on FIG. 4 i.e. extending sideways from the robot base 103 and maybe reach a location where a person could be positioned. A safety plane in one of the X and Y planes could be protecting from collision with persons standing next to or parsing by the robot arm.

It should be mentioned, that two or more, typically one or two, safety planes may exist parallel to each other in the same plane. In FIG. 4, the safety planes 440 and 441 are in the same plane i.e. parallel to each other.

Although the present invention is described with respect to a robot illustrated as a robot art, it should be mentioned, that the present invention may also with advantage be use in relation to other types of robots. An example is the so-called Automated Guided Vehicles (AGV; Automated Guided Vehicles), an AGV with a robot arm e.g. the robot arm illustrated on FIG. 1, etc.

Using the AGV as example of other types of robots (including the robot illustrated in FIG. 1), the safety plane can be established and displaced with respect to the AGV coordinate system, a coordinate system of a physical entity (fixed or movable), etc. Hence, the safety plane may be dynamic i.e. moving with the AGV.

Independent of robot type, the safety planes can be established via the AR device with respect to a coordinate system chosen via the AR device. In this way, it is possible to establish both a dynamic safety plane that moves with the robot and also a safety plane that is fixed i.e. made with reference to e.g. a stationary base of a robot arm.

Note that e.g. spatial reference system such as coordinate system associated with the robot arm should be selected if the safety plane is to be displayed relative to the robot arm. A safety plane may be established without being related to the robot arm. In this situation the coordinate system of the robot an of the safety plane is not the same. It is possible to link two independent coordinate systems. As mentioned, load/upload of safety planes from/to the robot controller, requires wireless or wired data exchange between the AR device and the robot arm controller.

A safety plane can be established by pointing the camera of the tablet towards an area where a safety plane is desired and tapping the screen. The desired area could be a location where the AGV/robot should not be allowed, hence an action is required from the robot when reaching a safety plane. As mentioned, the safety controller monitors movement of the robot relative to safety planes and stop operation of the robot if it predicts that interaction between robot and safety plane is unavoidable i.e. if the process controller fails to react in time.

In general, the safety plane can be interpreted by the robot controller as an input that can be toggled by e.g. a robot arm or AGV. When a robot arm or AGV moves into a safety plane (i.e. coordinates of a robot part is coincident with coordinates of a safety plane) this could by the robot controller be interpreted as a trigger event for changing operation of the robot. Such change in operation could lead e.g. to reducing speed, reducing force, reducing freedom in joint angles, stopping the robot, changing direction of a movement, enter safe mode of operation, etc.

It should be noted, that a robot controller output could be deactivated, activated or toggled when a safety plane is detected.

FIG. 5 illustrate a robot arm 101 seen from above. Here the safety planes 550, 551 are illustrated along the X axis spaced from the robot base along the Y axis. The illustrated robot arm handles a workpiece at a first part of a table 552 and on a second part of the table 553 spaced by a free space 554. The safety planes 550, 551 ensures that the robot arm does not reach out over the sides of the table parts 552, 553 opposite the free space 554. To protect a person or other obstacles that are moving into the free space 554 between the table parts 552, 553 a scanner (sometimes referred to as laser range scanner or area scanner) 555 is used to monitor the free space 554. The scanner 555 provides a signal to the robot controller if a person enters the free space 554 and the robot controller will stop the robot when receiving such signal.

In the illustrated embodiment, no safety planes are defined around the free space 554. However, in an alternative embodiment, a safety plane can be established between the table parts 552, 553 and the free space 554, and when the robot 101 is at the coordinates of such safety plane e.g. the speed of the robot is reduced when the robot arm 101 enters a space where a person potential could be located. Thereby, the safety plane could be said to protect the person if a collision occurs, and consequently the travel time from the first table part 552 to the second table part 553 is increased.

In essence, the scanner is used to prevent a person from being harmed when entering a zone around the robot arm from where the person can touch the robot arm during operation. In this situation, the robot can also touch the person and therefore safety planes in combination with scanners can be used to protect persons and objects within reach of the robot by adapting to the control of the robot to the possibility of a collision. For instance, if a person enters such zone, the scanner will inform the robot control software that a person has entered the free space 554, but the operation of the robot arm is only stopped if the robot also has passed the safety planes established between the table parts 552, 553 and the free space 554. Thereby it can be ensured that a person entering free space 554 cannot be damaged by the robot arm and the robot arm can still be operating when it is operating in the table parts 552, 553. Hence, a scanner can be used alone or together with the safety planes to increase safety around a robot arm leading to a safe robot system with optimized operation.

It should be noted, that if the scanner 555 is located in the AR device with reference to the spatial reference system, the AR software can assist the user in defining the area, the scanner should monitor As can be understood from the above, the safety plane is defined in the robot control software via one of the possible programming interfaces. In addition to the already mentioned, the safety plane can also be defined/established and displaced via a portable AR device.

The AR device is in an embodiment portable and could be embodied as a smartphone, tablet, teach pendant or similar portable devices having a display and AR software. Larger devices such as a laptop could also be used as an AR device according to the invention. The AR device should be possible to move around and at the same time the user should be able to operate it via its display.

It should be noted that the camera does not have to be an integrated part of the AR device. Further, it should be noted, that multiple cameras may assist in increasing the precision of the adjustment of the safety plane(s). In an embodiment, one of multiple cameras is used to record depth. In an embodiment the camera could be supplemented or replaced by 3D camera, Lidar, Sonar or other similar distance measuring devices.

A reference to recording of surroundings via the AR device is a reference to one of known AR recording/display methods. These methods include at least so-called video see through, optical see through and spatial AR. The latter is not suitable to use from a mobile device, such as smart phones.

The AR device displays to a user the virtual safety planes on top/overlaid real-time recordings, performed by the camera of the AR device, of its surroundings including the robot, fixtures, persons, etc. When the user moves the AR device and thereby its camera, the relative position of the safety plane to the robot is maintained so the user is able to observe the safety plane in different views/from different angles.

The software of the AR device allows the AR device to connect with the robot controller e.g. via a wired connection, Bluetooth, WiFi or similar. The connection may be established by scanning a robot identifying tag associated with the robot. This tag may be a barcode, QR (QR; Quick Response) code or similar that is provided with information sufficient for the AR software to identify and connect with the robot controller. Information contained in the tag may include network identification of the robot controller such as its IP (IP; Internet Protocol) address, robot type/model information, etc. The tag may be a physical tag such as a sticker attached to the robot or it may be a digital tag available on the teach pendant hardwired to the robot controller.

As mentioned, the AR device is using its camera to record the robot and its surroundings. Further the AR device may use internal sensors such as accelerometers and gyros to establish position and orientation of the AR device relative to the robot and thereby the correct visualization of the virtual environment including the safety planes relative to the robot.

In an embodiment, the AR device is using the information received about the robot model and thus its dimensions to, from a picture or video recording the robot, establish the origin of the spatial reference system such as e.g. the robot base coordinate system i.e. of the three coordinate axes $x_{base}$, $y_{base}$, $z_{base}$ (an example of a spatial reference system). From this the safety planes can be positioned in the virtual environment superimposed on elements recorded from the actual real world.

In an embodiment, the internal sensors of the AR device are sufficient to positioning of the AR device and the virtual environment relative to the robot. The AR device may use e.g. a 3D model of the robot base 103 together with an information tag to increase this relative positioning. The positioning may include aligning the robot base 103 with the base coordinate system. This initial alignment of the virtual environment (virtual world) and the real world is necessary at least once and may be necessary to repeat if the AR device is moved too far from the robot or if the AR device is use to something else. Then the sensors of the AR device are used to detect movement of the robot (or other objects) with reference to the robot base.

Once connected, the AR software is able to retrieve (e.g. by downloading) position of already existing safety planes and display them as a virtual plane at its coordinates in e.g. the robot base coordinate system overlaid the real-time recordings of the robot surroundings. In this way it is easy for the user to visually verify if the safety plane is positioned correct.

If the user is not satisfied, with the position of the safety plane it is possible, via the display of the AR device, to adjust/displace the location of the safety plane. In an embodiment, this can be done by tapping the visualized safety plane and drag it to a new position. When doing so, it is not important where on the safety plane the user tap and hold to drag the safety plane in that it is the entire safety plane that is moved as described above.

This visual programming of the robot control software is extremely user friendly compared to known programming methods in that the user, before approving a location of the safety plane can visually see the location in different views and thereby ensure that the safety plane is aligned with e.g. a table, walk passage, fixture, etc.

Beside the displacement, safety planes can also be created via the AR software of the AR device. Once created and subsequently displaced it is only available on the AR device, hence the robot controller is not updated with position of new safety planes or displacement of existing safety planes before the user approves and uploads these to the robot controller.

Accordingly, the AR device allows the user to retrieve existing safety planes, create new safety planes and displace these planes in the AR software running on the AR device. The virtual safety planes are visualized to the user via a display of the AR device overlaid recordings of its physical surroundings allowing the user to view the safety planes from different angle and finally approve safety plane position. This is done by the AR software that transpose the virtual safety planes so that they are positioned correct in the robot base coordinate system i.e. as a virtual wall in the display of the AR device. The display of the AR device i.e. the visualization of safety planes relative to the robot is updated continuously when the AR device is moved in space by the user.

It should be noted that the AR device may automatically establish or suggest establishing a safety plane in relation to or associated with a real-world item recorded by the AR device. Safety planes are typically positioned along the side of a table, walk areas, where the robot is not allowed to be, where the robot has to be operated with reduced parameter settings, etc. so if the AR device recognize a table, it may suggest to the user, to create a safety plane in relation to that table.

Such automatically created/suggested safety plane may be visualized at a position relative to the robot within reach of the robot arm. An automatically created safety plane may be suggested based on information from safety planes associated with older robots/previously installed robots e.g. in similar robot cells or carrying out similar work. Such information may be retrieved from a cloud service connected to the robot controller or AR device. Finally, it should be mentioned that one safety plane may be automatically mirrored e.g. from one side of the robot to another side of the robot.

Automatically creating a safety plane associated with a e.g. a table recorded by the AR device is advantageous in that the user does not need to create the safety plane. The user may need to perform an adjustment of the automatically created safety plane.

The user may use different gestures on the display of the AR device to adjust i.e. create, move, rotate, translate, etc. a safety plane in virtual environment. One would obviously be single or double tab on the display, but also triple and more tabs, sliding or swiping would be possible to use as a gesture for e.g. creation, grab and displace, etc. of a safety plane. Other input devices such as buttons may also be used to indicated that now a point of a safety plane is established or moved.

The gestures may depend on the type of AR device. Hence if the AR device is a head mounted device the gestures may include moving and/or positioning hands or fingers. If the AR device comprises a screen the gestures would typically require fingers touching the screen. In principles, the same gestures could have the same effect independent of the type of AR device.

A safety plane may be moved by tabbing the safety plane and then slide the finger over/at the display to the new desired location of the safety plane where the finger is moved away from the display to save the new location.

FIG. 6 illustrates a safety plane 660 in the X plane that is being displaced from Y=1 to Y=4. It is illustrated, that the X value and the Z values are the same i.e. the size or extend of the safety plane 660 has not changed only its location in space has change along the Y axis. Because the safety plane 660 extends along the X axis and Z axis, the illustrated safety plane may be referred to as a safety plane in the XZ plane. Note that an alternative terminology may be that the safety plane 660 is an Y plane safety plane in that its' normal vector is parallel with the Y-axis. The XZ plane safety plane 660 is displaced along its normal vector which in this figure is coincident with the Y axis.

In the embodiment illustrated on FIG. 7 a safety plane 770 is adjusted also along its normal vector. The normal vector in this illustration is not parallel nor perpendicular to any of the X, Y or Z axis.

FIG. 8 illustrates a Cartesian coordinate system illustrating three safety planes one in each of the X, Y and Z planes. All these planes are illustrated in line with the respective axis they are named after. Hence, the safety plane in the X plane 880 (sometimes also referred to as the YZ plane) is defined by all values of X is equal to 0 where, in the illustrated example, the values of both Y and Z are 8. The normal vector of the X plane extends parallel to the X axis. Similarly, the safety plane in the Y plane 881 (sometimes also referred to as the XZ plane) is defined by all values of Y is equal to 0 where the values of both X and Z are 8. The normal vector of the Y plane extends parallel to the Y axis. Similarly, the safety plane in the Z plane 882 (sometimes also referred to as the XY plane) is defined by all values of Z is equal to 0 where the values of both X and Y are 8. The normal vector of the Z plane extends parallel to the Z axis Hence, the safety plane 880 in the X plane extends along the Y and Z axes, the safety plane 881 in the Y plane extends along the X and Z axes and the safety plane 882 in the Z plane extends along the X and Y axes.

A displacement of these planes will increment or decrement the respective X, Y and Z values from 0, in the illustrated example, to the value of X, Y or Z at the end position of the respective X, Y or Z planes.

Figure 9:
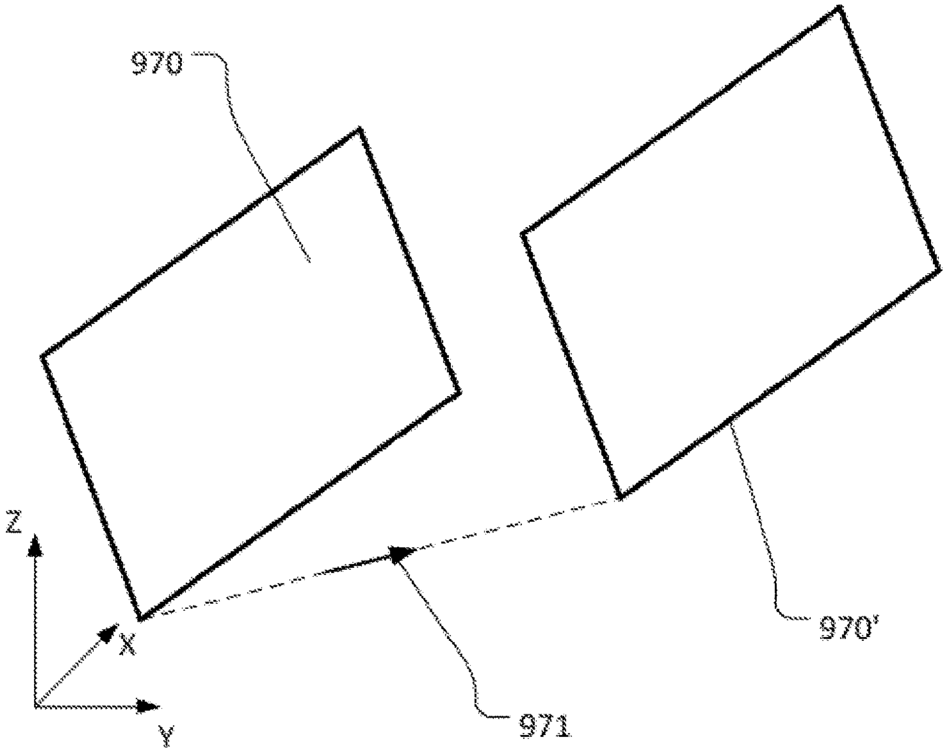

In the embodiment illustrated on FIG. 9 a safety plane 970 is displaced by translation (illustrated by dashed line) along a translation vector 971. The safety plane is displaced to an adjusted position 970'. The translation vector 971 can be any translation vector in the spatial reference system.

Figure 10:
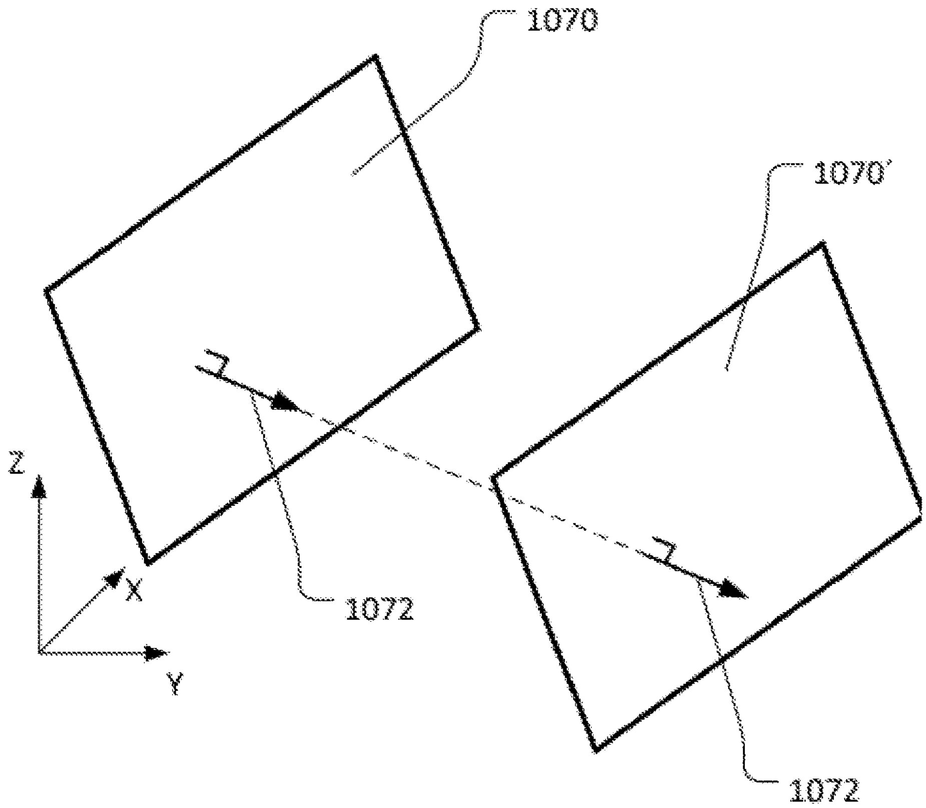

In the embodiment illustrated on FIG. 10 a safety plane 1070 is displaced by translation (illustrated by a dashed line) along a translation vector which is a normal vector 1072 of the safety plane. The safety plane is displaced to an adjusted position 1070'. The normal vector 1072 can be any vector perpendicular to the safety plane.

Figure 11:
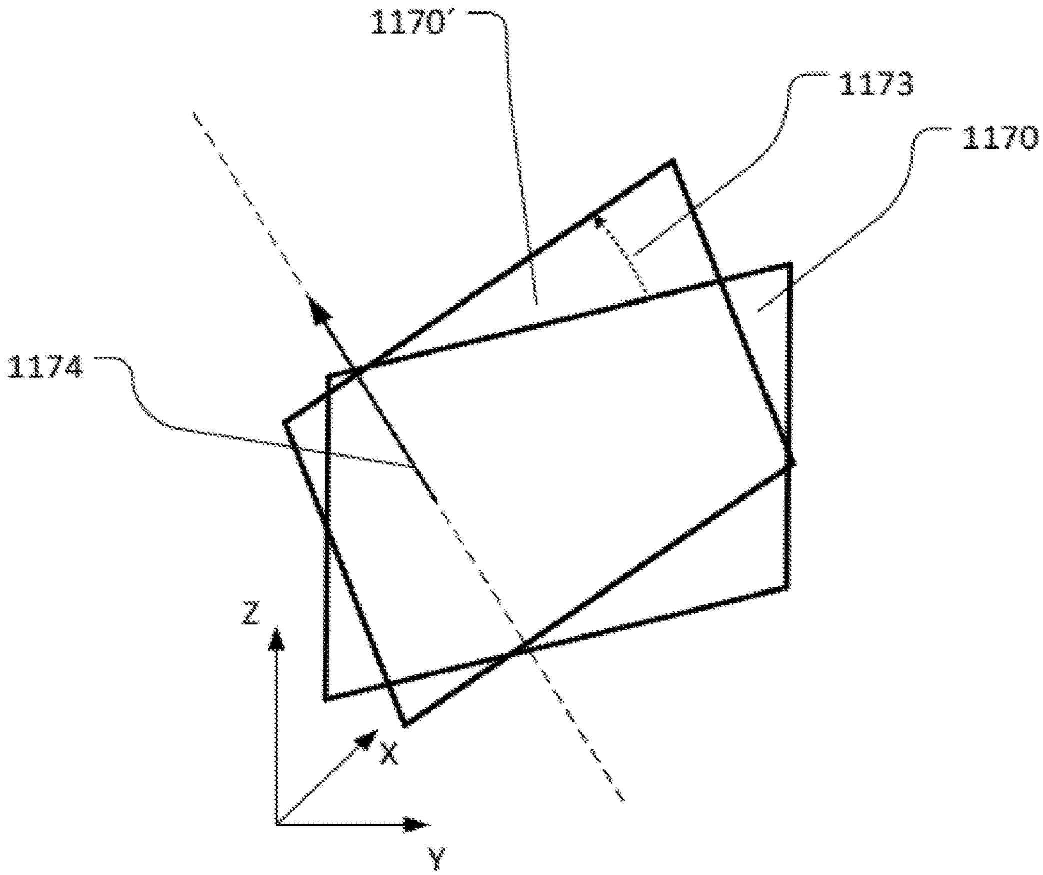

In the embodiment illustrated on FIG. 11 a safety plane 1170 is displaced by rotation (illustrated by dotted arrow 1173) around a rotation vector 1174. The safety plane is displaced to an adjusted position 1170'. The rotation vector 1174 can be any vector in the spatial reference system.

Figure 12:
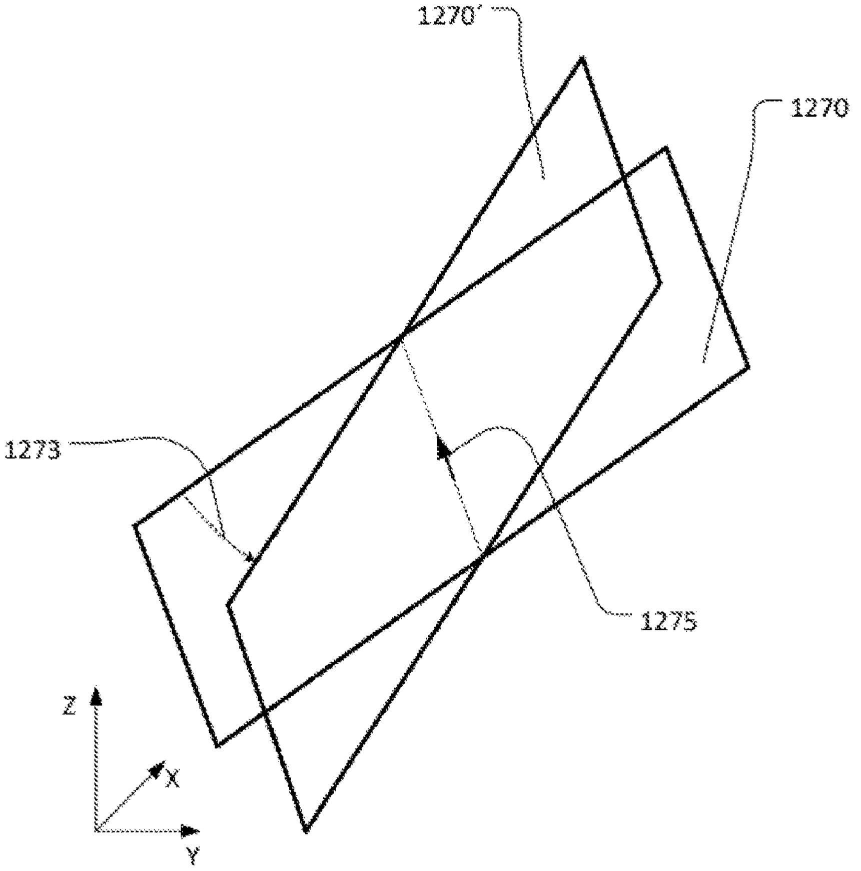

In the embodiment illustrated on FIG. 12 a safety plane 1270 is displaced by rotation (illustrated by dotted arrow 1273) around a rotation vector which is a plane vector 1275 lying on the safety plane 1270. The safety plane is displaced to an adjusted position 1270'. The plane vector 1275 can be any vector lying on the safety plane.

In FIGS. 9-14 a left-handed cartesian coordinate system X, Y and Z are illustrated as the spatial reference system, however as noted previously the spatial reference system can be indicated as any kind of spatial reference system.

In the embodiment illustrated on FIG. 13 a safety plane 1370 is displaced by translation (illustrated by dashed line) along a translation vector 1371 which is parallel with the Y-axis of a cartesian coordinate system. The safety plane is displaced to an adjusted position 1370'. It is to be understood that in other embodiments the translation vector can be parallel with any of the X, Y, Z axes in a cartesian coordinate system and in other embodiments also be lying on any one the X, Y, Z axes.

In the embodiment illustrated on FIG. 14 a safety plane 1470 is displaced by rotation (illustrated by dotted arrow 1473) around a rotation vector 1474, which is parallel with the Z-axis of a cartesian coordinate system. The safety plane is displaced to an adjusted position 1470'. It is to be understood that in other embodiments the rotation vector can be parallel with any of the X, Y, Z axes in a cartesian coordinate system and in other embodiments also be lying on any one of the X, Y, Z axes.

Accordingly, at least from the description of FIGS. 5-14 it is understood that according to the present invention, a safety plane can be displaced as a whole plane. Hence, in an embodiment displacement of a safety plane may literally include displacement of the whole safety plane i.e. simultaneous displacement of all sets of (X, Y, Z) coordinates defining the safety plane and not just part of a safety plane such as a "safety plan corner".

With this said, it should be mentioned that the safety plan may be displaced around an axis or a point of the safety plane. Accordingly, in this embodiment a displacement of the safety plane may include displacement of all sets of coordinates defining the safety plan except for those around which the safety plane is displaced. As a non-limiting example could be mentioned, that if displacement is a rotation of the safety plane around a point or axis, the coordinates of such point or axis may not be displaced.

A displacement may include several steps to reach a satisfying replacement/placement of the safety wall. Hence, when first a safety plane is selected or established, it may be displaced by moving parallel along a normal or translation vector, then it may be displaced by rotation around a point or axis and finally it may be moved along a normal or translation vector again. As indicated below, these vectors may be the X, Y and Z axes according to which the robot is controlled.

The grid of the Cartesian coordinate system may in an embodiment be visualized to the user. The safety plane may snap to this grid (visual or not) and thus only be moved in steps defined by the steps/size of this grid. These steps may be adjustable in the software.

Also, this grid may be configured as a circular grid, an isometric top, right or left side grid, etc. thereby assisting the user in defining the desired safety plane. Hence, if a circular grid is used with center in the robot base axis a 360 degrees safety plane is easy to define. Similar, a box like or 3D like safety plane is easy to define if the individual safety planes of such box like safety plane are defined one (or two) at the time using the isometric top, right and left side grids.

The software such as e.g. the software of the AR device may recognized objects (including areas restricted to the robot) of the robot surroundings and establish a grid according to one or more of these object. Such object related grid may assist the user in easily define a safety plane relative to such object to ensure a sufficient distance from robot/payload/tool to such object. The AR device (or robot controller) may then translate safety plane coordinates of this object related grid to coordinates of the coordinate system according to which the robot controller is controlling to robot.

Accordingly, a displacement according to the present invention include moving at least two points of a safety wall i.e. the coordinates of at least two points of the safety wall is changed. Thereby in principle, it may be an infinite safety plane that is displaced. Further, it should be noted, that the safety plane is displaced without changing the geometry of the safety plane.

FIGS. 15*a* and 15*b* illustrates a six-axes robot arm 1501 where FIG. 15*a* is a front view and FIG. 15*b* is a top view. The robot arm comprises a robot base 1505 carrying a robot base joint 1503*a* that is directly connected to a shoulder joint 1503*b* and is configured to rotate the robot arm around a base axis 1511*a* (illustrated by a dotted line). The shoulder joint 1503*b* is connected to an elbow joint 1503*c* via a robot link 1504*b* and is configured to rotate the robot arm around a shoulder axis 1511*b*. The elbow joint 1503*c* is connected to a first wrist joint 1503*d* via a robot link 1504*c* and is configured to rotate the robot arm around an elbow axis 1511*c*. The first wrist joint 1503*d* is connected to a second wrist joint 1503*e* and is configured to rotate the robot arm around a first wrist axis 1511*d*. The second wrist joint 1503*e* is connected to a robot tool Joint 1503*f* and is configured to rotate the robot arm around a second wrist axis 1511*e*. The robot tool joint 1503*f* comprising the robot tool flange 1507, which is rotatable around a tool axis 1511*f*.

A safety plane 1570 which is parallel with and coincidence with the base axis 1511*a* is illustrated in FIG. 15*b*. The safety plane 1570 can for instance be used to indicate a safety zone of the elbow joint 1503*c* of the robot arm, where the hatched side indicates a zone where the elbow joint is not allowed to enter, and the non-hatched side indicated the allowed zone of the elbow joint. The safety plane 1570 can via the AR device be is displaced by rotation (illustrated by dotted arrow 1573) around a rotation vector 1574 (illustrated in FIG. 15*a*), which is parallel and coincident with the base axis 1511*a*. The displacement can be made via gestures on the display of the AR device e.g. in combination with moving the AR device relative to the robot arm. The safety plane is displaced to an adjusted position 1570'. The safety plane 1570 can thus be displaced in joint space of the robot arm and it is to be understood that the displacement of a safety plane can be made in relation to any one of the joint axes of the robot arm, for instance the base axis 1511*a*, the shoulder axis 1511*b*, the elbow axis 1511*c*, the first wrist axis 1511*d*, the second wrist axis 1511*e* or the tool axis 1511*f*. Also, the safety plane can be configured in relation to any part or parts of the robot, meaning that only the position of the relevant parts of the robot arm triggers the safety action. Also, more than one safety plane can be configured in relation to any of the robot joint axes.

When one or more safety planes are established, a simulation of the trajectories of the robot arm may be simulated in the display of the AR device. In this way, it is possible for the user to determine if the safety planes are positioned as desired with respect of the actual movement of the robot arm.

Such simulation may include both robot trajectories, but also payloads/workpieces that is to be handled by the robot arm/tool, joint or tool limitations, persons within reach of the robot, safety spheres around robot tool, etc. In this way, it is possible to simulate different aspects related to safety around the robot arm.

In case the robot program controlling the trajectories of the robot is available to the AR device, the AR device may simulate the trajectories. During this simulation of a program cycle, the user may e.g. pause the simulation to set a safety plane based on the location of the robot in the simulation of the robot cycle visualized at the display of the AR device. The simulation may be overlaid the real-world items, include areas scanner coverage, etc.

Beside the above-described visualization of the virtual safety planes, the AR device can also visualize other virtual elements relating to the robot and its surroundings.

When a tool is connected to the robot tool flange 104, this tool extends in space together with any workpiece carried or handled by the tool. The position of the tool and/or workpiece in space may be defined according to a tool flange coordinate system (an example of a spatial reference system). Coordinates in the tool flange coordinate system is of course also coordinates in the robot base coordinate system, however since the tool is moving, the coordinates of the tool in the robot base coordinate system could be said to be dynamic. Therefore, to reduced complexity in this description, when a reference is made to the position in space of a tool/workpiece the coordinates of this position is coordinates of the robot base coordinate system.

Hence, when a tool is connected to the robot tool flange there is a risk that this tool extents through the safety plane to the prohibited side of the safety plane, while the robot arm is still on the right side of the safety plane. To visualize this and thereby be able to program the robot trajectory to avoid this or to position the safety plane to avoid this, a tool safety sphere can be established around the tool. The safety sphere is preferably established with reference to the tool flange coordinate system which then is translated to coordinates in the robot base coordinates system.

By visualizing a tool safety sphere in the virtual environment together with a safety plane, it is possible to see if the tool or workpiece stay within the boundaries defined by the safety planes.

It is furthermore possible to visualise the orientation of the tool and limits in freedom of tool orientation. Depending on type of tool, where in the reach of the robot the tool is used, weight of payload, how the programmer has defined limitations, etc. certain limitations in freedom of orientation of the tool may exist. These examples of elements that may limit freedom of orientation of a tool can, in the robot control software, be translated to one or more sets of coordinates defining operation limits of the robot.

These operation limits can also be visualized e.g. by a different colour than safety planes in the display of the AR device. In combination with safety planes, these limitations can ensure that e.g. the tool is only allowed to point in one direction.

It is noted that such operation limits can also be defined by the user via the display of the AR device as described above with respect to the establishing of safety planes.

It is further possible to visualize robot joint operation and limits hereof. A joint limitation would typically define a maximum angle for a joint. As described above with reference to operation limits and safety planes, the operation limits may also be established via the display of the AR device.

It is further possible to register the scanner 335 in the robot base coordinate system. In this way it is possible for the AR device to suggest to the user areas that should be monitored by the scanner.

In an embodiment, this may further lead to the AR device suggesting a relationship between operation speed and area to be monitored. Hence, the lager area that is monitored by the scanner, the slower the robot speed have to be for the robot control software to be able to stop the robot if a person enters the monitored area. The other way around, the smaller the monitored area is, the faster robot speed. As both small, monitored area and fast robot speed is desired, the AR device can assist in suggesting an appropriate robot speed to a certain size of area monitored by the scanner.

It is further possible to visualize joint health and/or joints or other part of the robot that is ready for maintenance.

From the above it is now clear, that the present invention relates to a robot such as a robot arm the trajectories are limited by safety planes. These safety planes can be established or displace by assistance of an AR device having a physical display. A user can via the physical display displace and/create safety planes.

The user is able to see a visualization of a virtual safety plane overlaid a recording of the real world and via that visualization adjust or displace the virtual safety planes.

| List | |
|---|---|
| 100 | robot system |
| 101 | robot arm |
| 102a-102f | robot joint |
| 103 | robot base |
| 104 | robot tool flange |
| 105a-105f | axis of robot joints |
| 106a-106f | rotation arrow of robot joints |
| 107 | robot tool flange reference point |
| 108 | robot base reference point |
| 109 | direction of gravity |
| 110 | robot controller |
| 111 | interface device |
| 112 | display |
| 113 | input devices |
| 114 | force torque sensor |
| 115 | acceleration sensor |
| 216a; 216b; 216f | output flange |
| 217a; 217b; 2179f | joint motors |
| 218a; 218B, 218f | output axle |
| 219a; 219b; 219f | joint sensor |
| 220a-220f | joint sensor signal |
| 221 | memory |
| 222 | processor |
| 223a, 223b, 223f | motor control signals |
| 224 | force signal |
| 225 | acceleration signal |
| 330 | end of visual part of safety plane in AR device |
| 331 | safety plane |
| 440 | first safety plane |
| 441 | second safety plane |
| 442 | portable AR device |
| 443 | physical display of AR device |
| 550 | first X plane safety plane |
| 551 | second X plane safety plane |
| 552 | first table part |
| 553 | second table part |
| 554 | free space |
| 555 | area scanner |
| 600 | safety plane in X plane |
| 770 | safety plane |
| 880 | X plane |
| 881 | Y plane |
| 882 | Z plane |
| 970 | safety plane |
| 970' | adjusted position of safety plane |
| 971 | translation vector |
| 1070 | safety plane |
| 1070' | adjusted position of safety plane |
| 1072 | normal vector |
| 1170 | safety plane |
| 1170' | adjusted position of safety plane |
| 1173 | arrow illustrating rotation of safety plane |
| 1174 | rotation vector |
| 1270 | safety plane |
| 1270' | adjusted position of safety plane |
| 1273 | arrow illustrating rotation of safety plane |

-continued

| List | |
|---|---|
| 1275 | plane vector |
| 1370 | safety plane |
| 1370' | adjusted position of safety plane |
| 1371 | translation vector |
| 1470 | safety plane |
| 1470' | adjusted position of safety plane |
| 1473 | arrow illustrating rotation of safety plane |
| 1474 | rotation vector |
| 1501 | six-axes robot arm |
| 1503a | base joint |
| 1503b | shoulder joint |
| 1503c | elbow joint |
| 1503d | first wrist joint |
| 1503e | second wrist joint |
| 1503f | tool joint |
| 1504b, 1504c | robot link |
| 1505 | robot base |
| 1507 | tool flange |
| 1511a | base axis |
| 1511b | shoulder axis |
| 1511c | elbow axis |
| 1511d | first wrist axis |
| 1511e | second wrist axis |
| 1511f | tool axis |
| 1570 | safety plane |
| 1570' | adjusted position of safety plane |
| 1573 | arrow illustrating rotation of safety plane |
| 1574 | rotation vector |

The invention claimed is:

1. A method for adjusting a location of a safety plane for a robot based on input from a portable augmented reality (AR) device comprising a display device and a camera, where the robot is controlled by a controller, and where the method comprises:

establishing a spatial reference system with reference to the robot;

establishing a communication connection between the portable AR device and the controller;

obtaining, from the camera, a recording of surroundings of the portable AR device including the robot;

causing the recording of the surroundings to be displayed on the display device;

creating a virtual environment based on the spatial reference system, the virtual environment comprising a representation of the safety plane;

causing the virtual environment to overlay the recording of the surroundings on the display device; and obtaining an adjusted location of the safety plane following displacement of the representation of the safety plane in the virtual environment in response to input from the display device, the input comprising a tap action and a drag action, and the displacement being a displacement that is along a normal vector to the safety plane.

2. The method of claim 1, wherein the spatial reference system comprises a three axis cartesian coordinate system having an origin at a base of the robot.

3. The method of claim 2, wherein the displacement of the representation of the safety plane comprises a displacement in one of the three axes in the three axis cartesian coordinate system.

4. The method of claim 1, wherein the displacement of the representation of the safety plane occurs when the robot is not in motion.

5. The method of claim 1, further comprising:

establishing the safety plane using the AR device.

6. The method of claim 1, wherein the robot comprises a robotic arm; and wherein overlay of the representation of the safety plane on the display device is limited by an extent of a reach of the robotic arm.

7. The method of claim 1, wherein information about the safety plane is imported from the controller.

8. The method of claim 1, further comprising:

receiving, at the controller and from the display device, data associated with the representation of the safety plane that has been manually approved.

9. The method of claim 1, wherein the AR device receives identifying information about the robot from the controller.

10. The method of claim 1, further comprising:

automatically associating the representation of the safety plane with a real-world object in the recording.

11. The method of claim 1, further comprising:

establishing a communication connection between an area scanner and the AR device, the area scanner monitoring at least part of the surroundings.

12. A method for adjusting a location of a safety plane for a robot based on input from a portable augmented reality (AR) device comprising a display device and a camera, where the robot is controlled by a controller, and where the method comprises:

establishing a spatial reference system with reference to the robot;

establishing a communication connection between the portable AR device and the controller;

obtaining, from the camera, a recording of surroundings of the portable AR device including the robot;

causing the recording of the surroundings to be displayed on the display device;

creating a virtual environment based on the spatial reference system, the virtual environment comprising a representation of the safety plane;

causing the virtual environment to overlay the recording of the surroundings on the display device;

obtaining, based on input from the display device, an adjusted location of the safety plane following displacement of the representation of the safety plane in the virtual environment; and undoing the displacement of the representation of the safety plane in the virtual environment.

13. The method of claim 12, wherein the displacement of the representation of the safety plane comprises a translation along a translation vector associated with the spatial reference system.

14. The method of claim 13, wherein the translation vector comprises a normal vector to the representation of the safety plane.

15. The method of claim 12, wherein the displacement of the representation of the safety plane comprises a displacement of an entirety of the representation of the safety plane in a direction that is normal to the representation of the safety plane.

16. The method of claim 12, wherein the displacement of the representation of the safety plane comprises a displacement of an entirety of the representation of the safety plane around one axis of a three axis cartesian coordinate system.

17. The method of claim 12, wherein the displacement of the representation of the safety plane comprises a displacement of an entirety of the representation of the safety plane relative to one point associated with the spatial reference system.

18. The method of claim 12, wherein the displacement of the representation of the safety plane is based on a tab-hold-slide gesture on the display device.

19. A method for adjusting a location of a safety plane for a robot based on input from a portable augmented reality (AR) device comprising a display device and a camera, where the robot is controlled by a controller, and where the method comprises:

establishing a spatial reference system with reference to the robot;

establishing a communication connection between the portable AR device and the controller;

obtaining, from the camera, a recording of surroundings of the portable AR device including the robot;

causing the recording of the surroundings to be displayed on the display device;

creating a virtual environment based on the spatial reference system, the virtual environment comprising a representation of the safety plane;

causing the virtual environment to overlay the recording of the surroundings on the display device; and obtaining, based on input from the display device, an adjusted location of the safety plane following displacement of the representation of the safety plane in the virtual environment;

wherein the displacement of the representation of the safety plane comprises a rotation around a rotation vector associated with the spatial reference system.

20. The method of claim 19, wherein the rotation vector comprises a plane vector lying on the representation of the safety plane.

21. A method for adjusting a location of a safety plane for a robot based on input from a portable augmented reality (AR) device comprising a display device and a camera, where the robot is controlled by a controller, and where the method comprises:

establishing a spatial reference system with reference to the robot;

establishing a communication connection between the portable AR device and the controller;

obtaining, from the camera, a recording of surroundings of the portable AR device including the robot;

causing the recording of the surroundings to be displayed on the display device;

creatin a virtual environment based on the spatial reference system, the virtual environment comprising a representation of the safety plane;

causing the virtual environment to overlay the recording of the surroundings on the display device; and obtaining, based on input from the display device, an adjusted location of the safety plane following displacement of the representation of the safety plane in the virtual environment;

wherein the safety plane is a first safety plane; and wherein the first safety plane is linked to a second safety plane so that movement of the first safety plane causes movement of the second safety plane.

22. A system for adjusting a location of a safety plane for a robot, the system comprising:

a controller configured to perform operations comprising:

controlling the robot; and establishing a spatial reference system with reference to the robot; and a portable augmented reality (AR) device comprising a display device and a camera, the portable AR device being configured to perform operations comprising:

capturing a recording of surroundings of the portable AR device including the robot;

establishing a virtual environment based on the spatial reference system, the virtual environment comprising a representation of the safety plane;

displaying the virtual environment on the display device, the virtual environment overlaying the recording, receiving an adjusted location of the safety plane based on a displacement of the representation of the safety plane in the virtual environment, the displacement being based on an input comprising a tap action and a drag action, and the displacement being a displacement that is along a normal vector to the safety plane; and providing the adjusted location to the controller.

23. The system of claim 22, wherein the spatial reference system comprises a three axis cartesian coordinate system having an origin at a base of the robot.

24. The system of claim 23, wherein the displacement of the representation of the safety plane comprises a displacement in one of the three axis of the three axis cartesian coordinate system.

25. The system of claim 22, wherein the representation of the safety plane is established on the portable AR device.

26. The system of claim 22, wherein the robot comprises a robotic arm; and wherein display of the representation of the safety plane on the display device is limited to an extent of a reach of the robotic arm.

27. The system of claim 22, wherein the representation of the safety plane is automatically associated with a real-world object in the recording.

* * * * *